United States Patent

Hiramatsu

[11] Patent Number: 6,009,131
[45] Date of Patent: Dec. 28, 1999

[54] SYNCHRONIZER

[75] Inventor: Katsuhiko Hiramatsu, Yokohama, Japan

[73] Assignee: Matsushita Electric Industrial Co., Ltd., Osaka, Japan

[21] Appl. No.: 08/900,862

[22] Filed: Jul. 25, 1997

[30] Foreign Application Priority Data

Aug. 29, 1996 [JP] Japan ................................. 8-245469

[51] Int. Cl.⁶ .............................................. H04L 7/00
[52] U.S. Cl. ........................ 375/354; 375/357; 375/365
[58] Field of Search ................................ 375/275, 344, 375/354, 356, 357, 364, 365, 366; 370/324, 462

[56] References Cited

U.S. PATENT DOCUMENTS

| | | | |
|---|---|---|---|
| 3,812,430 | 5/1974 | Schmidt et al. | 375/356 |
| 4,344,176 | 8/1982 | Qureshi | 375/275 |
| 4,686,673 | 8/1987 | Hotta | 370/324 |
| 4,811,338 | 3/1989 | Haruyama et al. | 370/462 |
| 5,535,249 | 7/1996 | Miyashita | 375/344 |

FOREIGN PATENT DOCUMENTS

| | | |
|---|---|---|
| 80298/94 | 7/1995 | Australia . |
| 14718/95 | 10/1995 | Australia . |
| 24849/95 | 1/1996 | Australia . |

*Primary Examiner*—Stephen Chin
*Assistant Examiner*—Chieh M. Fan
*Attorney, Agent, or Firm*—Stevens, Davis, Miller & Mosher, L.L.P.

[57] ABSTRACT

A detection circuit of a synchronizer detects a difference between a reference timing of a transmitter and a reference timing of a receiver based on a time of receiving a known transmission pattern sent from the transmitter. An average value calculation circuit calculates an average value of the difference detected by the detection circuit. An integration circuit determines an integrated value by integrating the average value each time of interrupting the receiver. A correction value calculation circuit calculates a correction value to correct the reference timing of the receiver in forward direction in the case where the integrated value exceeds a predetermined first threshold level and to correct the reference timing of the receiver backward in the case where the integrated value is reduced below a predetermined second threshold level.

78 Claims, 21 Drawing Sheets

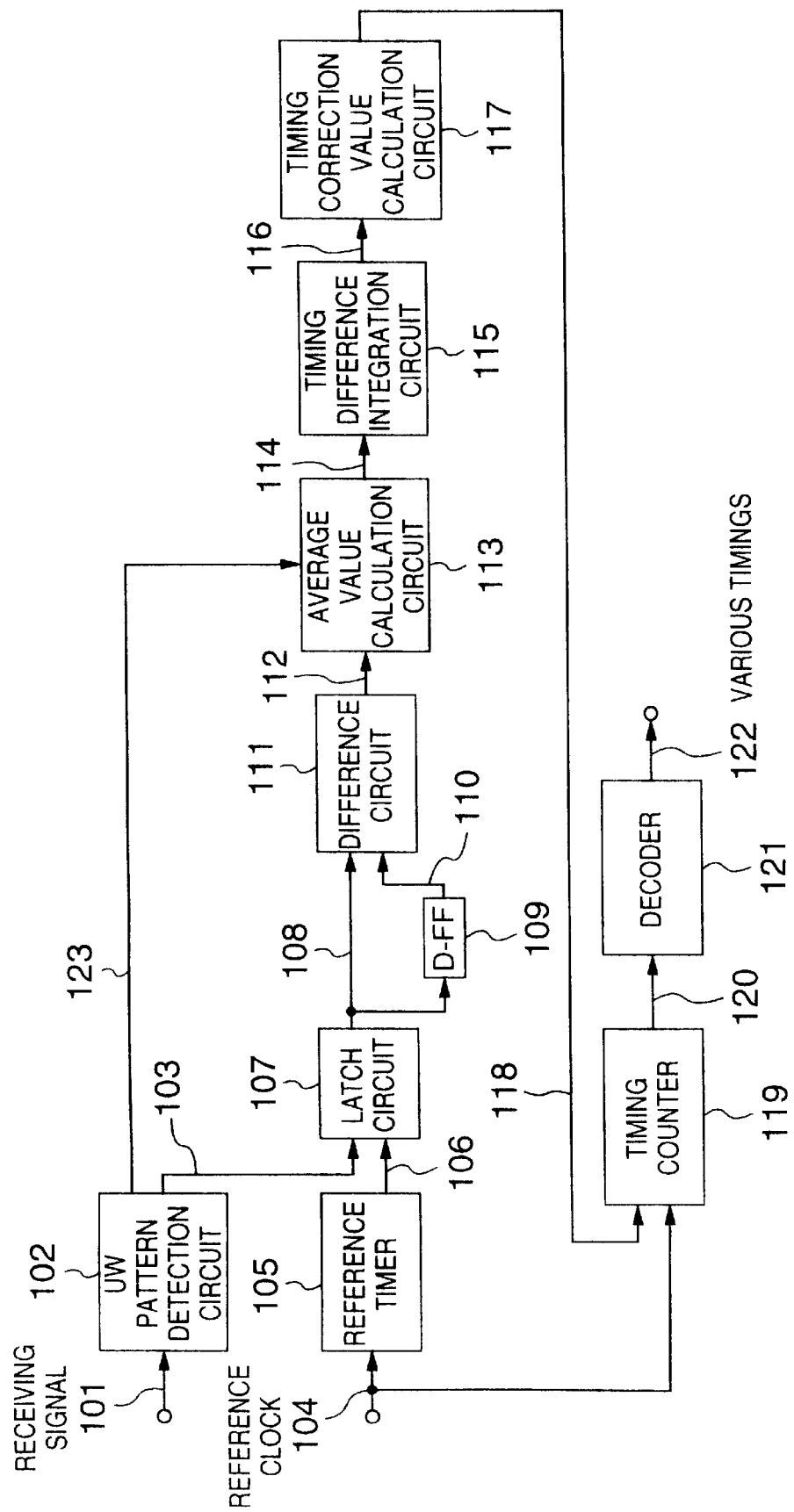

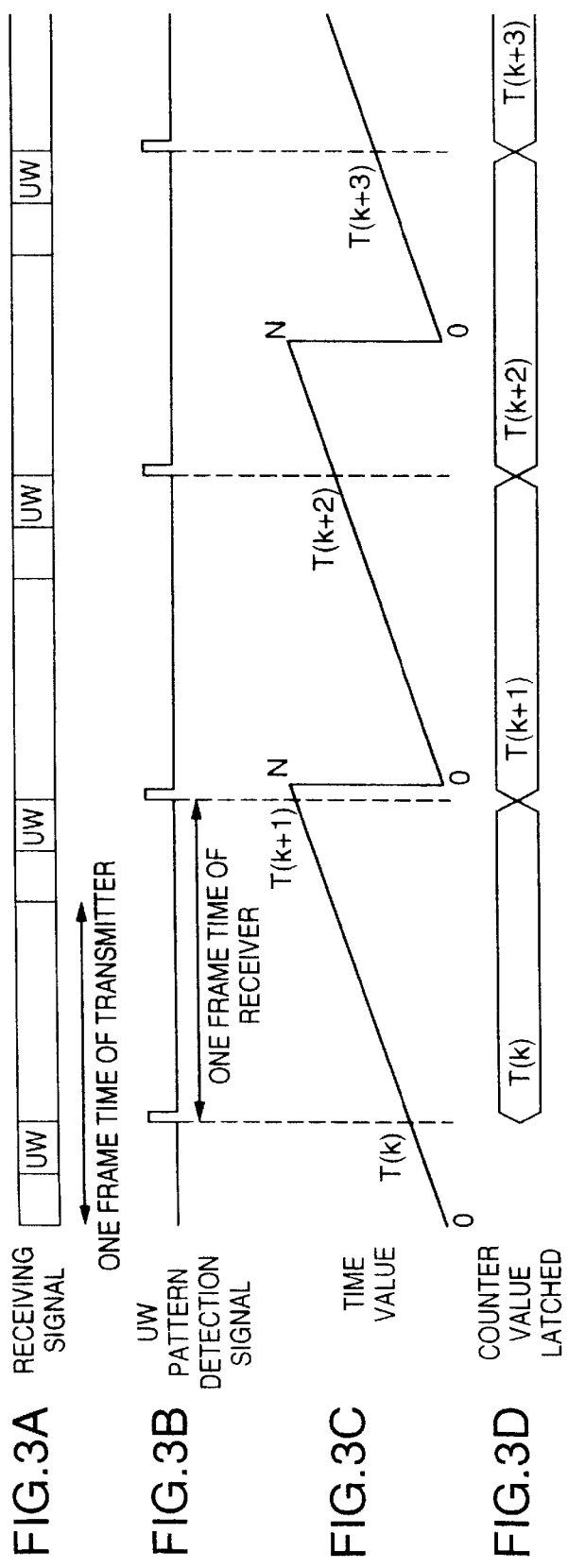

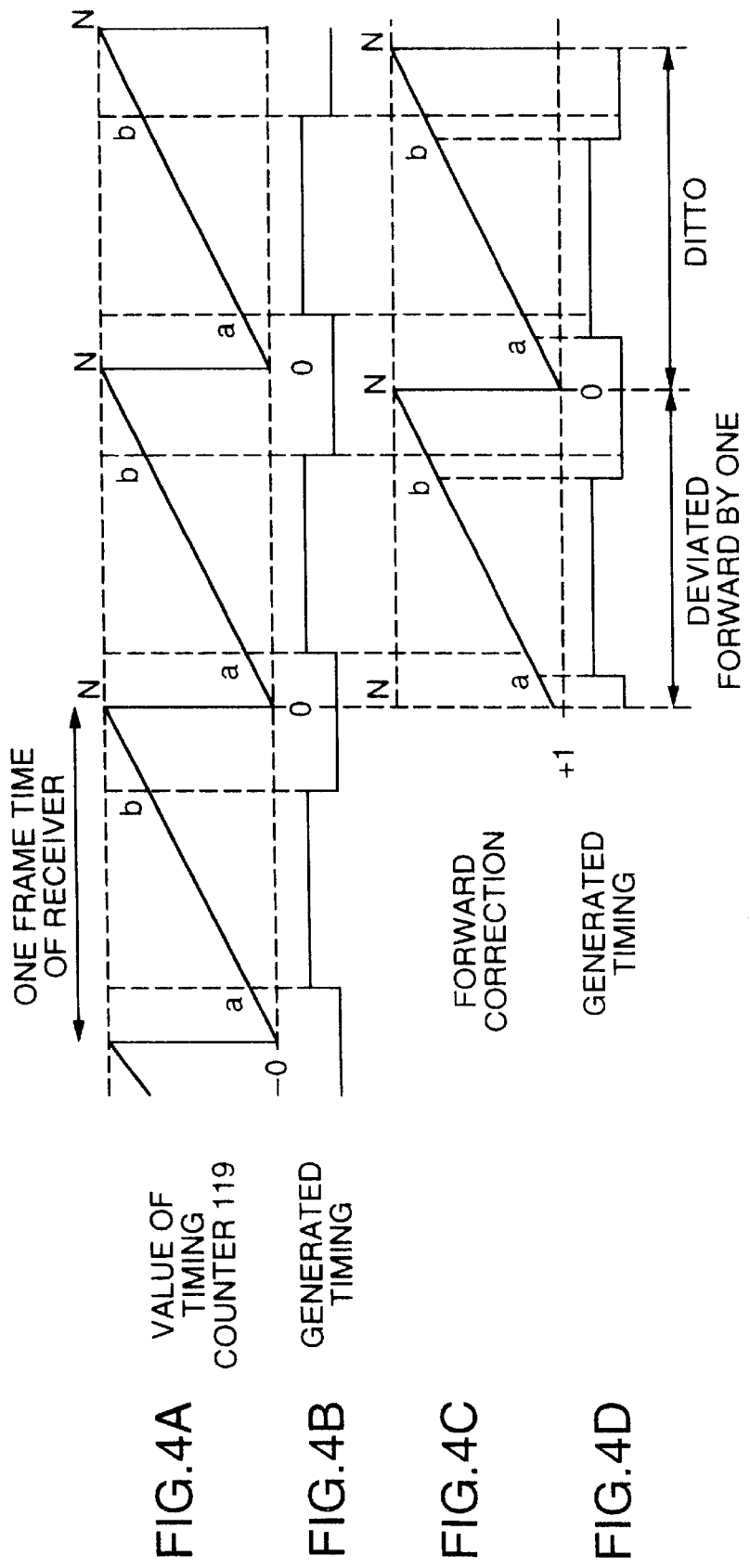

SYNCHRONIZER

BACKGROUND OF THE INVENTION

1. Field of the Invention

The present invention relates to a synchronizer for a communication system, or more in particular to a synchronizer in which a timing deviation can be estimated based on the average value of the difference in frame timing even in the case where a unique word (UW) pattern fails to be received, thereby making it possible to hold a frame timing even after a protracted line disconnection.

2. Description of the Related Art

A conventional synchronizer of this type, as shown in FIG. 1A, comprises a UW pattern detection circuit 2, a reference timer 5, a latch circuit 6, a histogram calculation circuit 8, a timing correction value calculation circuit 10, and a decoder 13. The UW pattern detection circuit 2 detects a unique word pattern (hereinafter referred to as "the UW pattern") contained in a known symbol pattern (normally called "the synchronous word" or "the unique word") of a receiving signal 1 shown in FIG. 1B. The reference timer 5 calculates the receiving time based on a reference clock 4. The latch circuit 6 fetches the time when the UW pattern is detected (the UW pattern detection time) by latching an output signal of the reference timer 5 by an output signal 3 of the UW pattern detection circuit 2. The histogram calculation circuit 8 calculates the histogram of the UW pattern detection time from an output signal 7 of the latch circuit 6 and further calculates the difference between the frame timing of a transmitter and the frame timing of a receiver based on the calculated histogram and an output signal 12 of the timing correction value calculation circuit 10. The timing correction value calculation circuit 10 produces on the basis of an output signal 9 of the histogram calculation circuit 8 a control signal 11 to be output to the reference timer 5 for correcting the frame timing of the receiver in the forward direction when deviated backward of the frame timing of the transmitter and backward when deviated forward of the frame timing of the transmitter. Specifically, in correcting the frame timing of the receiver in forward direction, the initial value of the reference timer 5 is set to +1 by the control signal 11, while in correcting the frame timing of the receiver backward, the initial value of the reference timer 5 is set to -1 by the control signal 11. In this way, the frame length is increased or decreased by one frame, as the case may be, to set the frame timing of the receiver to conform with that of the transmitter.

As described above, in the conventional synchronizer, the frame timing of the receiver is corrected by detecting the UW pattern constantly and thus by detecting the difference between the frame timing of the receiver and that of the transmitter. As a result, in the case where the UW pattern cannot be detected over a long time due to a line disconnection or the like, the frame timing of the receiver and that of the transmitter are deviated considerably from each other.

SUMMARY OF THE INVENTION

The object of the present invention is to provide a synchronizer in which the frame timing of the receiver and that of the transmitter are prevented from deviating from each other considerably even in the case where a known symbol pattern fails to be detected over a long time due to a line connection or the like.

In order to achieve the above-mentioned object, according to the present invention, there is provided a synchronizer in which an average value of a difference between a frame timing of a receiver and a frame timing of a transmitter is calculated, the average value of the difference in frame timing is integrated at intervals of a predetermined frame time, and the timing is corrected based on the integrated value of timing deviations. Consequently, even in the case where the UW pattern fails to be detected, the timing deviation can be estimated based on the average value of the difference in frame timing. Even in the case where the line is disconnected over a long time, therefore, the appropriate frame timing can be held.

According to another aspect of the present invention, there is provided a synchronizer which comprises a detection circuit for detecting a difference between a reference timing of a transmitter and a reference timing of a receiver based on a time of receiving a known transmission pattern transmitted from the transmitter, an average value calculation circuit for calculating an average value of the detected difference, an integration circuit for integrating the average value each time of interrupting the receiver and determining an integrated value, and a correction value calculation circuit for correcting the reference timing of the receiver in forward direction in the case where the integrated value is larger than a first threshold value and correcting the reference timing of the receiver backward in the case where the integrated value is smaller than a second threshold value.

BRIEF DESCRIPTION OF THE DRAWINGS

FIG. 2 is a block diagram showing a synchronizer according to a first embodiment of the present invention.

FIGS. 3A to 3D are diagrams for explaining the operation of the synchronizer shown in FIG. 2.

FIGS. 4A to 4D are diagrams for explaining the operation of the synchronizer shown in FIG. 2.

Figure 1A:
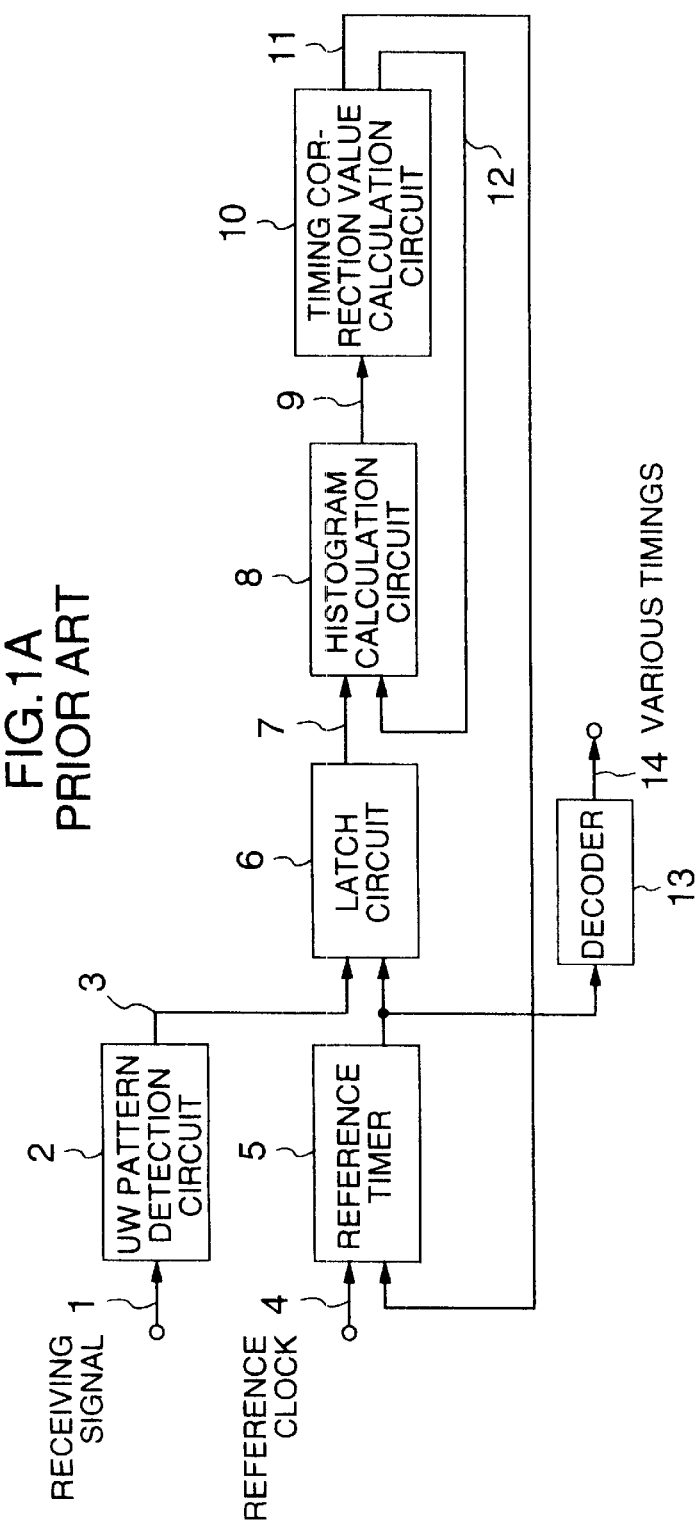
FIG. 1A is a block diagram showing a conventional synchronizer.

DESCRIPTION OF THE PREFERRED EMBODIMENTS (First Embodiment)

A synchronizer according to a first embodiment of the present invention comprises, as shown in FIG. 2, a UW pattern detection circuit 102, a reference timer 105, a latch circuit 107, a D flip-flop (D-FF) circuit 109, a difference circuit 111, an average value calculation circuit 113, a timing difference integration circuit 115, a timing correction value calculation circuit 117, a timing counter 119 and a decoder 121.

Figure 1B:
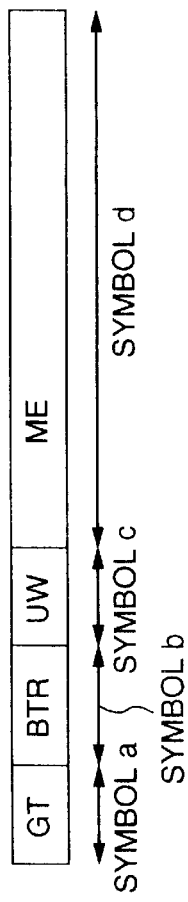
FIG. 1B is a diagram for explaining a frame format.

The UW pattern detection circuit 102 detects a UW pattern (FIG. 1B) contained in a receiving signal 101. Upon detection of the UW pattern, a UW pattern detection signal 103 is output and a UW pattern detection information signal 123, which indicates whether or not the UW pattern is detected, is generated. The reference timer 105 calculates a receiving time based on a reference clock 104. The latch circuit 107 latches an output signal 106 of the reference timer 105 by the UW pattern detection signal 103 from the UW pattern detection circuit 102 thereby to fetch a time (UW pattern detection time) when the UW pattern is detected. The D flip-flop circuit 109 holds the UW pattern detection time fetched into the latch circuit 107. The difference circuit 111 determines a difference (frame timing difference) between a frame timing of the transmitter and a frame timing of the receiver based on a difference between an output signal 108 of the latch circuit 107 and an output signal 110 of the D flip-flop circuit 109. The average value calculation circuit 113 updates an average value of the frame timing difference calculated based on an output signal 112 of the difference circuit 111 only when the detection of the UW pattern is indicated by the UW pattern detection information signal 123 from the UW pattern detection circuit 102. The timing difference integration circuit 115 integrates the average value of the frame timing difference based on an output signal 114 of the average value calculation circuit 113.

The timing correction value calculation circuit 117 produces a control signal 118 for the timing counter 119 on the basis of an output signal 116 of the timing difference integration circuit 115 in order to correct the frame timing of the receiver in forward direction in the case where it is deviated backward of the frame timing of the transmitter on the one hand and to correct the frame timing of the receiver backward in the case where it is deviated forward of the frame timing of the transmitter on the other hand. Specifically, in the case where the frame timing of the receiver is corrected in a forward direction, an initial value of the timing counter 119 is set to +1 by the control signal 118, while in the case where the frame timing of the receiver is corrected backward, the initial value of the timing counter 119 is set to −1 by the control signal 118. In this way, the frame length is increased or decreased, as the case may be, by one frame thereby to set the frame timing of the receiver to conform with the frame timing of the transmitter. The timing counter 119 counts the reference clock 104 by a period of one frame with the initial value set by the control signal 118 from the timing correction value calculation circuit 117. The decoder 121 generates various timings 122 based on an output signal 120 of the timing counter 119.

Now, the operation of the synchronizer according to this embodiment will be explained with reference to FIGS. 3A to 3D. The receiving signal 101 inserts therein the UW pattern for each frame as shown in FIG. 3A. The receiving signal 101 is transmitted based on the frame timing of the transmitter. The one-frame time of the transmitter can be detected, therefore, by detecting the intervals at which the UW patterns contained in the receiving signal 101 are received. In the receiver, UW pattern detection time T(k+1) is detected by the value on a timer built therein. The difference is determined between UW pattern detection time T(k+1) detected in the current frame and UW pattern detection time T(k) detected in the previous frame thereby to determine the one-frame time of the receiver (FIG. 3B). In fact, assuming that the maximum count value of the timer is N (FIG. 3C), the one-frame time of the receiver can be determined from the modulo calculation shown below.

$$\{T(k+1)+N-T(k)\} \text{ modulo } N \tag{1-1}$$

The difference between the value determined by equation (1-1) above and the standard frame time length constitutes the difference between the frame timing of the receiver and that of the transmitter.

The timing correction value calculation circuit 117 performs the following processes:

(1) The frame timing of the receiver, if deviated backward of the frame timing of the transmitter by a set value or more, is corrected in forward direction by the set value.

(2) The frame timing of the receiver, if deviated in a forward direction from the frame timing of the transmitter by a set value or more, is corrected backward by the set value.

(3) In the case where the deviation of the frame timing of the receiver from that of the transmitter is not more than the set value, then the frame timing of the receiver is not corrected.

Assume that the set value is 1 and that the frame timing of the receiver is required to be corrected in forward direction by the set value. The initial value of the timing counter 119 is set to +1. In the case where the frame timing of the receiver is required to be corrected backward by the set value, on the other hand, the initial value of the timing counter 119 is set to −1. In this way, the frame length is increased or decreased, as the case may be, by one frame. FIGS. 4A to 4D show an example of correcting the frame timing of the receiver by one in forward direction. This shows the manner in which the timing generated is corrected in forward direction by one by increasing the initial value of the timing counter 119 by one frame.

The average value calculation circuit 113 performs the following processes based on the UW pattern detection information signal 123 from the UW pattern detection circuit 102:

(1) The average value of the frame timing difference is updated for the frame in which the UW pattern is detected.

(2) The average value of the frame timing difference is not updated for the frame in which the UW pattern is not detected.

As a result, even in the case where the UW patterns are not detected continuously, the synchronizer according to this embodiment can correct the timing using the average value of the frame timing difference which is not updated.

(Second Embodiment)

Figure 5:
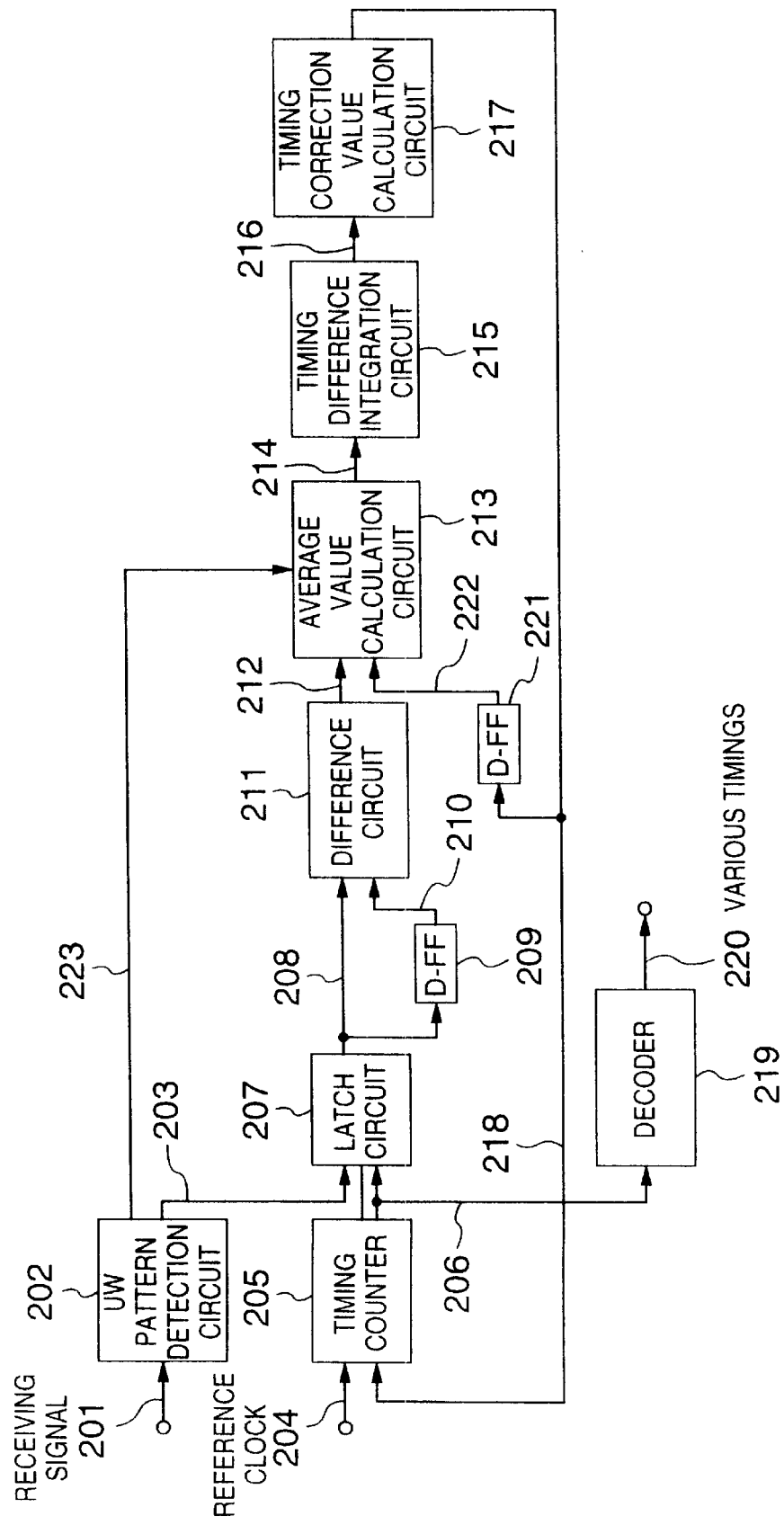
FIG. 5 is a block diagram showing a synchronizer according to a second embodiment of the present invention.

A synchronizer according to a second embodiment of the present invention, as shown in FIG. 5, is different from the synchronizer according to the first embodiment in that a timing counter 205 operates as the reference timer 105 shown in FIG. 2 at the same time.

In the synchronizer according to the first embodiment described above, the UW pattern receiving time is detected using the reference timer 105. Consequently, the clock rate of the timing counter 119 is normally the same as the symbol rate or the bit rate. It is therefore possible to detect the UW pattern receiving time with a higher accuracy by increasing the clock rate of the reference timer 105 as compared with that of the timing counter 119. Such a synchronizer, however, requires two counters for the reference counter 105 and the timing counter 119, and therefore increases in circuit size and power consumption.

In view of this, the synchronizer according to this embodiment is adapted to detect the receiving time of the UW pattern as well using the timing counter 205. As a result, a latch circuit 207 is supplied with an output signal 206 of the timing counter 205. Also, in order to compensate for the increase or decrease in an output signal 212 of a difference circuit 211 due to the detection of the UW pattern receiving time using the timing counter 205, a D flip-flop (D-FF) circuit 221 for holding a control signal 218 output from a timing correction value calculation circuit 217 is inserted between the timing correction value calculation circuit 217 and an average value calculation circuit 213.

A UW pattern detection circuit 202 detects a UW pattern contained in a receiving signal 201. Upon detection of the UW pattern, a UW pattern detection signal 203 is output and a UW pattern detection information signal 223, which indicates whether or not the UW pattern is detected, is generated. The latch circuit 207 latches the output signal 206 of the timing counter 205 by the UW pattern detection signal 203 from the UW pattern detection circuit 202, thereby fetching a time when the UW pattern is detected (UW pattern detection time). A D flip-flop circuit 209 holds the UW pattern detection time fetched into the latch circuit 207. The difference circuit 211 determines a difference between the frame timing of the transmitter and that of the receiver (frame timing difference) based on the difference between an output signal 208 of the latch circuit 207 and an output signal 210 of the D flip-flop circuit 209. According to this embodiment, the UW pattern detection time is detected using the timing counter 205 corrected in timing. When the timing is corrected, therefore, the frame timing difference determined by the difference circuit 211 is increased or decreased by the amount of the timing correction. In view of this, the D flip-flop circuit 221 holds the control signal 218 from the timing correction value calculation circuit 217, and the frame timing difference determined by the difference circuit 211 is corrected in the average value calculation circuit 213 in accordance with the timing correction value indicated by an output signal 222 of the D flip-flop circuit 221. The average value calculation circuit 213 updates the average value of the corrected frame timing difference only when the UW pattern detection information signal 223 from the UW pattern detection circuit 202 indicates that the UW pattern is detected. A timing difference integration circuit 215 integrates the average value of the frame timing difference based on an output signal 214 of the average value calculation circuit 213.

On the basis of an output signal 216 of the timing difference integration circuit 215, the timing correction value calculation circuit 217 generates the control signal 218 for the timing counter 205 in order to correct the frame timing of the receiver in forward direction, if deviated backward of that of the transmitter, and to correct the frame timing of the receiver backward, if deviated forward of the frame timing of the transmitter. Specifically, in the case of correcting the frame timing of the receiver in forward direction, the initial value of the timing counter 205 is set to +1 by the control signal 218, while in the case of correcting the frame timing of the receiver backward, the initial value of the timing counter 205 is set to −1 by the control signal 218. In this way, the frame timing of the receiver is set to conform with that of the transmitter by increasing or decreasing, as the case may be, the frame length by one frame. The timing counter 205 counts a reference clock 204 by frame period with the initial value set by the control signal 218 from the timing correction value calculation circuit 217. A decoder 219 generates various timings 220 based on the output signal 206 of the timing counter 205.

Figure 6:
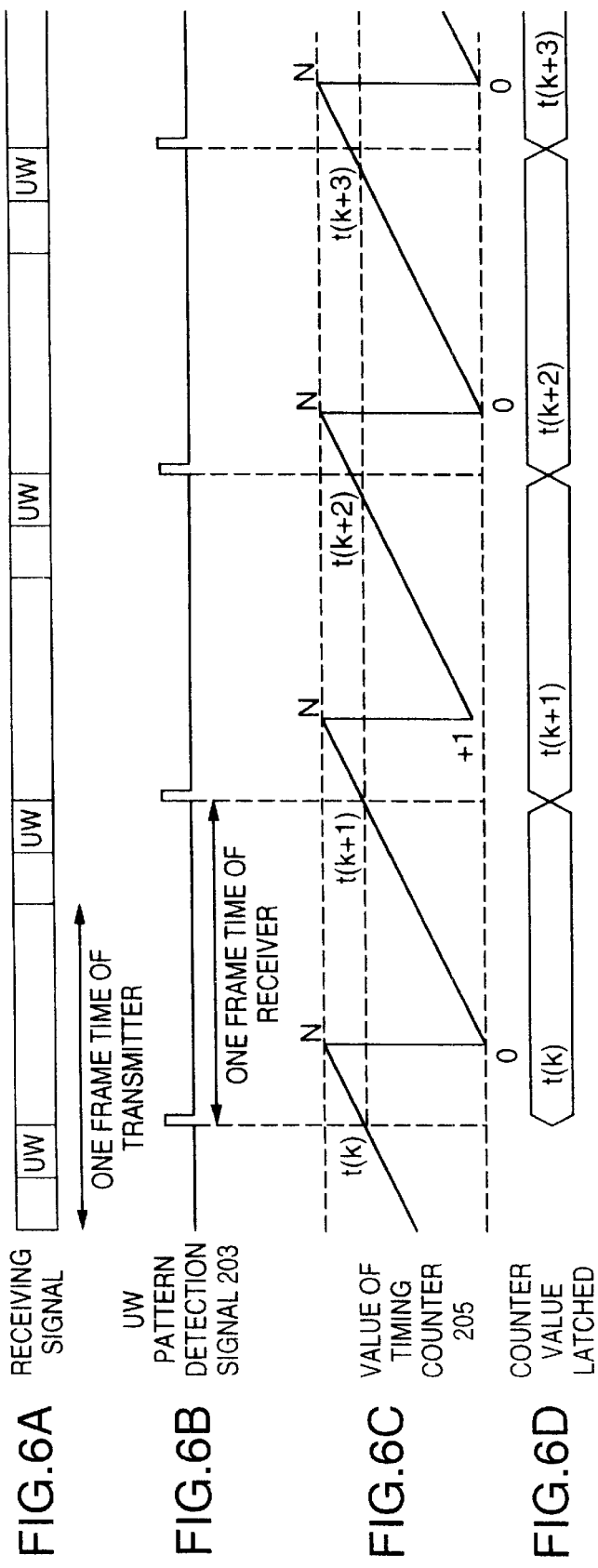
FIGS. 6A to 6D are diagrams for explaining the operation of the synchronizer shown in FIG. 5.

Now, the change in the UW pattern receiving time due to the timing correction will be explained with reference to FIGS. 6A to 6D. As shown in FIG. 6A, the receiving signal 201 inserts therein the UW pattern in each frame thereof. In the shown example, the timing is corrected during the period from the time when the second UW pattern from the left is received to the time when the third UW pattern is received. The initial value of the timing counter 205 thus is set to +1 as shown in FIG. 6C. The UW pattern detection time points fetched into the latch circuit 207 the respective frames are assumed to be t(k), t(k+1), t(k+2), t(k+3), respectively, as shown in FIG. 6D. Assuming that the one-frame time of the transmitter is identical to that of the receiver, the UW pattern detection time points t(k), t(k+1), t(k+2), t(k+3) for the respective frames have equal intervals. Once the timing is corrected as described above, however, the UW pattern detection time points t(k+2), t(k+3) for the third and subsequent frames from the left in the diagram are deviated to assume a value larger by one than the UW pattern detection time points t(k), t(k+1) for the first and second frames from left, respectively. Consequently, the frame timing difference calculated by the difference circuit 211 is given by the equation shown below. It is seen that the timing difference between a frame corrected in timing and the next frame is increased by the timing correction value.

$$t(k+1)-t(k)=N \tag{2-1}$$

$$t(k+2)-t(k+1)=N+1 \tag{2-2}$$

$$t(k+3)-t(k+2)=N \tag{2-3}$$

The average value calculation circuit 213 subtracts the timing correction value indicated by the output signal 222 of the D flip-flop circuit 221 from the frame timing difference between a timing-corrected frame and the next frame. As a result, the right frame timing difference is obtained for all the frames. The UW pattern detection time can thus be detected using the timing counter 205 for the timing correction.

(Third Embodiment)

Figure 7:
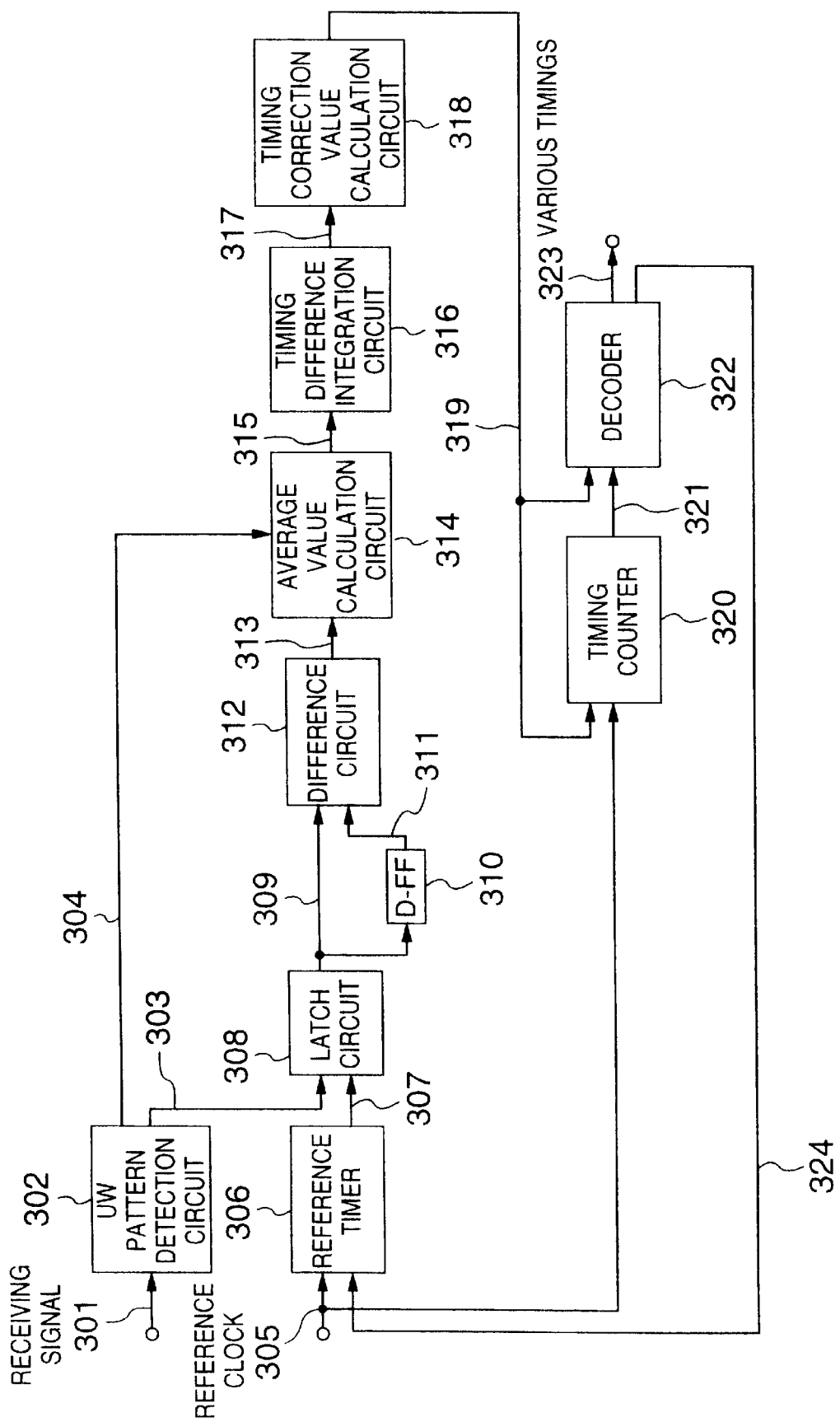
FIG. 7 is a block diagram showing a synchronizer according to a third embodiment of the present invention.
Figure 8:
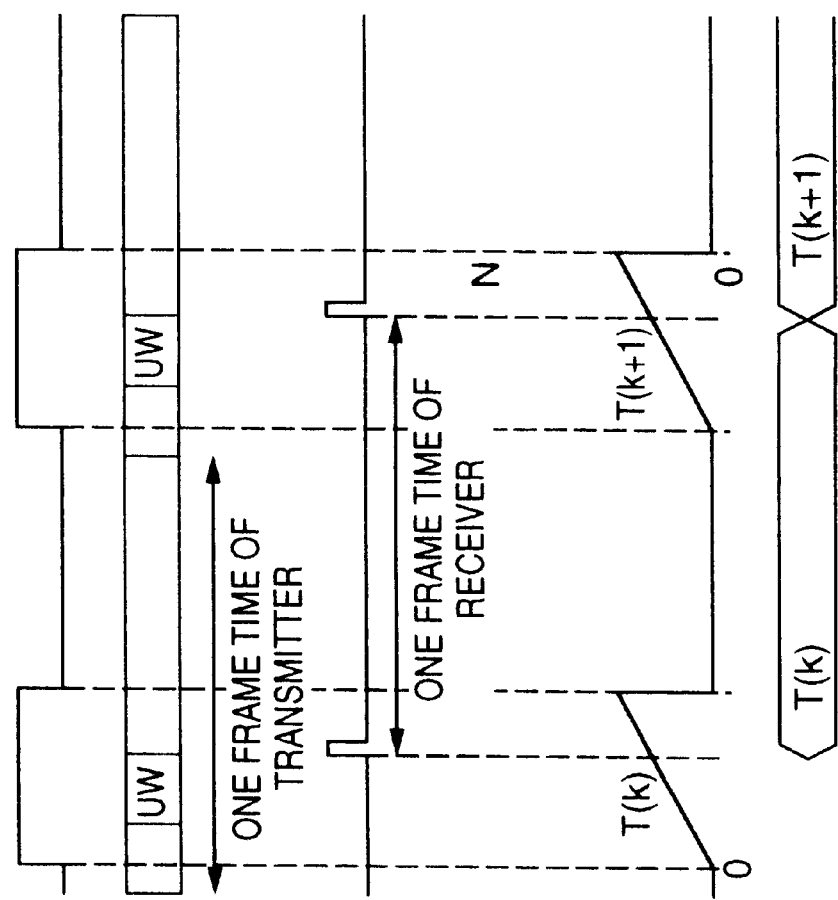
FIGS. 8A to 8E are diagrams for explaining the operation of the synchronizer shown in FIG. 7.

A synchronizer according to a third embodiment of the present invention, as shown in FIG. 7, is different from the synchronizer according to the first embodiment shown in FIG. 2 in that a reference timer control signal 324 is output to a reference timer 306 from a decoder 322 and that a control signal 319 output from a timing correction value calculation circuit 318 is applied also to the decoder 322.

In the synchronizer according to the first embodiment described above, the reference timer 105 is used for counting a period longer than the one-frame time, while the synchronizer according to the second embodiment uses the timing counter 205 for counting the same period as the one-frame time. An increased number of symbols or bits per frame is accompanied by an increased number of bits of the counter, an increased number of bits of the latch circuit, an increased number of bits of the D flip-flop circuit for holding the UW pattern detection time for the immediately preceding frame and an increased number of bits of the difference circuit, thereby leading to an increased power consumption and an increased circuit size.

In view of this, in the synchronizer according to this embodiment, the reference timer control signal 324 is applied to the reference timer 306 from the decoder 322 in order to reduce the number of bits of the counter making up the reference timer 306.

The basic operation of the synchronizer according to this embodiment is similar to that of the synchronizer according to the first embodiment. A method of producing the reference timer control signal 324 will be explained below.

The decoder 322 produces the reference timer control signal 324 based on an output signal 321 of a timing counter 320. This reference timer control signal 324, as shown in FIGS. 8A to 8E, activates the reference timer 306 a little before an assumed UW pattern receiving time, and deactivates the reference timer 306 a little after the assumed UW pattern receiving time. In the process, as explained above with reference to the synchronizer according to the second embodiment, in order to correct the change in the UW pattern detection time caused by the correction of the timing counter 320, the decoder 322 corrects the time to activate the reference timer 306 by the amount of correction value of the timing counter 320 based on the control signal 319 of the timing correction value calculation circuit 318.

The reference timer 306 is operated based on the reference timer control signal 324 produced in the manner described above thereby to produce the following effects:

(1) The number of bits of the counter making up the reference timer 306 can be reduced.

(2) The number of bits for calculation to detect the frame timing difference can be reduced.

(3) The operation time of the reference timer 306 can be reduced.

(Fourth Embodiment)

Figure 9:
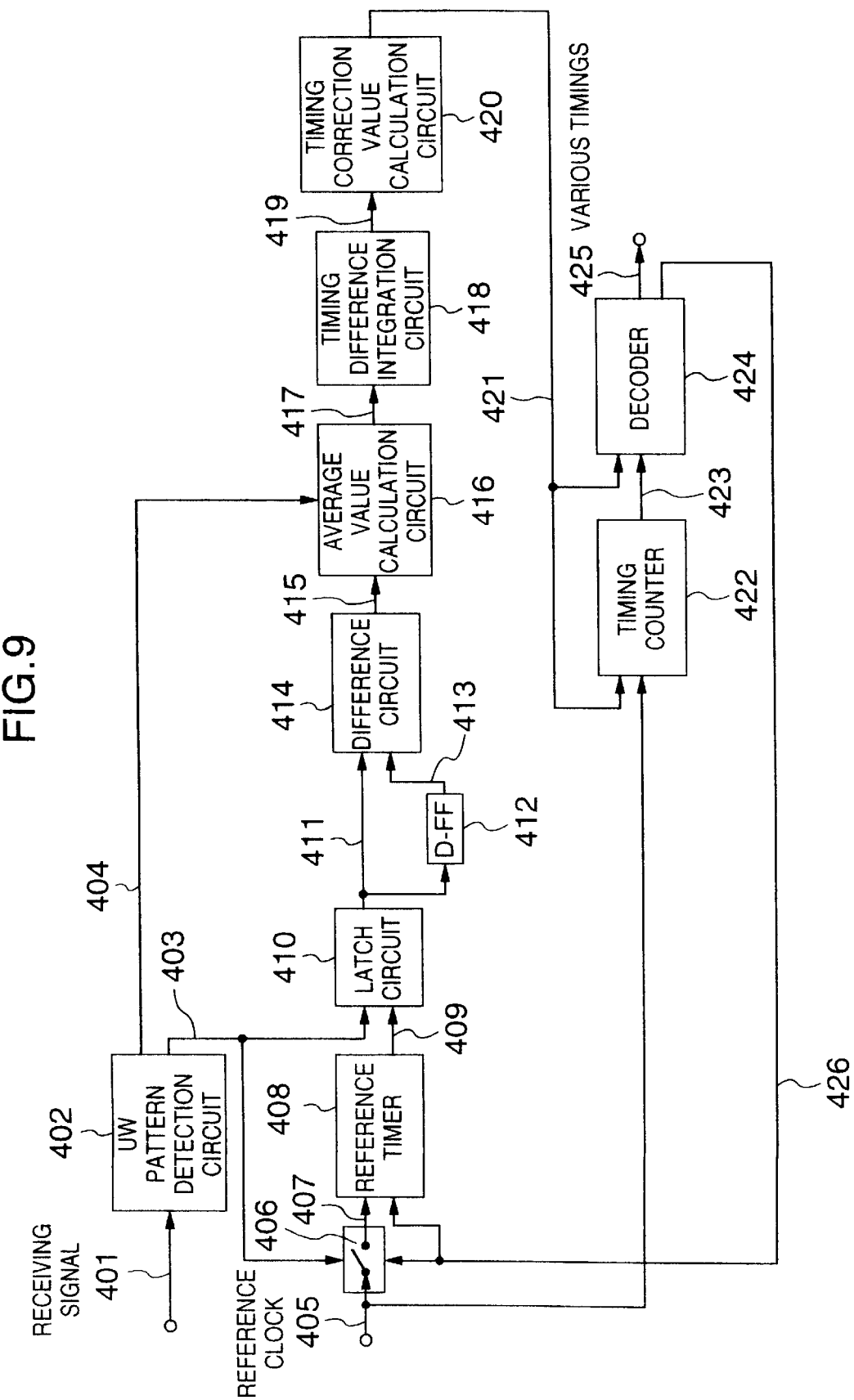
FIG. 9 is a block diagram showing a synchronizer according to a fourth embodiment of the present invention.

A synchronizer according to a fourth embodiment of the present invention is different from the synchronizer according to the third embodiment, as shown in FIG. 9, in that a switch 406 is provided on the input side of a reference timer 408 for switching the application and non-application of a reference clock 405 to the reference timer 408 in accordance with a reference timer control signal 426 from a decoder 424 and a UW pattern detection signal 403 from a UW pattern detection circuit 402.

The synchronizer according to the third embodiment described above activates the reference timer 306 a little before the assumed UW pattern receiving time and deactivates the reference timer 306 a little after the assumed UW pattern receiving time. In such a synchronizer, however, the power consumption of the counter constituting the reference timer 306 increases in the following cases:

(1) In the case where the counter making up the reference timer 306 operates at a very high speed.

(2) In the case where the UW pattern receiving time fluctuates to such an extent that the operation time of the counter making up the reference timer 306 is lengthened.

In view of this, the synchronizer according to this embodiment comprises the switch 406 and controls the operation of the reference timer 408 in the following manner:

(1) The reference timer 406 is activated a little before an assumed UW pattern receiving time.

(2) The reference timer 406 is deactivated upon detection of a UW patttern.

(3) The reference time 406 is deactivated a little after the assumed UW pattern receiving time when a UW pattern fails to be detected.

The basic operation of the synchronizer according to this embodiment is similar to that of the synchronizer according to the third embodiment described above. A method of controlling the switching operation of the switch 406 will be described. Assume that the reference timer 408 is activated at the leading edge of the reference timer control signal 426 from the decoder 424, as shown in FIGS. 10A, 10D.

Figure 10:
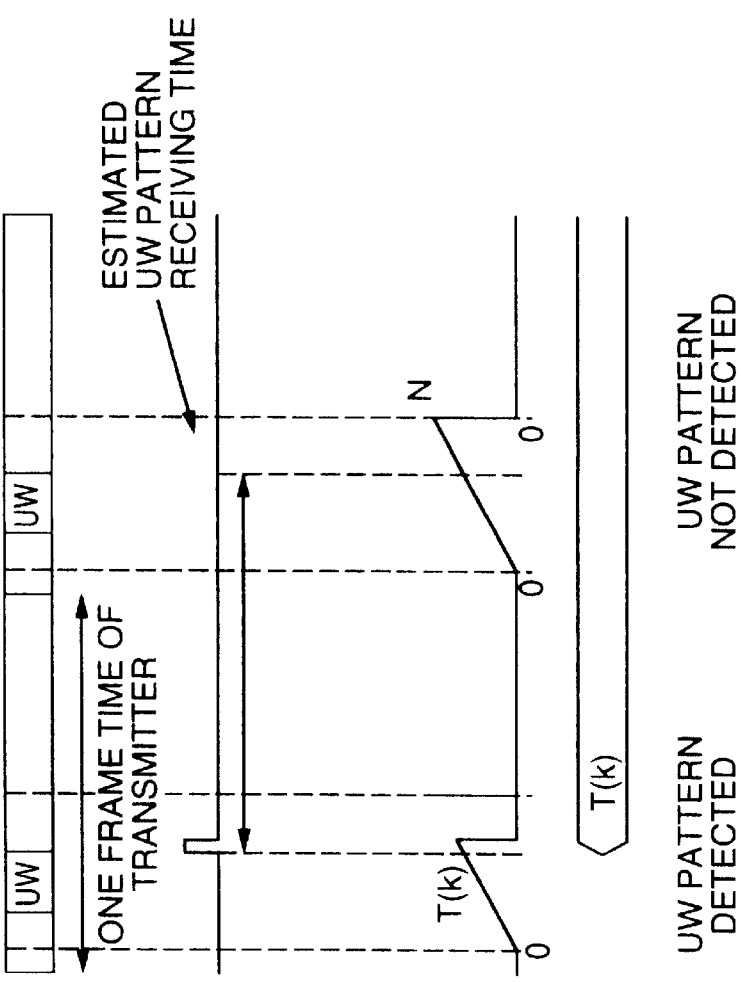
FIGS. 10A to 10E are diagrams for explaining the operation of the synchronizer shown in FIG. 9.

(1) In the case where a UW pattern is detected in the UW pattern detection circuit 402:

The reference timer 408 is activated at the leading edge of the reference timer control signal 426 from the decoder 424 (FIGS. 10A to 10C). As a result, UW pattern detection time T(k) is fetched into a latch circuit 410 by the UW pattern detection signal 403 (FIGS. 10D, 10E). Also, the switch 406 is opened by the UW pattern detection signal 403, so that the reference clock 405 stops being applied to the reference timer 408 and a count value of the counter making up the reference timer 408 is reset (FIG. 10D). After that, the reference timer 408 is deactivated at the falling edge of the reference timer control signal 426 (FIG. 10D).

(2) In the case where a UW pattern is not detected in the UW pattern detection circuit 402:

The reference timer 408 is activated at the leading edge of the reference timer control signal 426 from the decoder 424 (FIGS. 10A to 10C). In this case, the UW pattern detection signal 403 is not output from the UW pattern detection circuit 402 (FIG. 10C), and therefore the counter making up the reference timer 408 continues to count. After that, the reference timer 408 is deactivated at the falling edge of the reference timer control signal 426 (FIG. 10D). In the process, the UW pattern detection time fetched into the latch circuit 410 remains at the previous UW pattern detection time T(k) (FIG. 10E). An updating of an average value in an average value detection circuit 416 is thus prohibited by a UW pattern detection information signal 404.

In the manner described above, the synchronizer according to this embodiment can realize a low power consumption by shortening the operation time of the reference timer 408.

(Fifth Embodiment)

Figure 11:
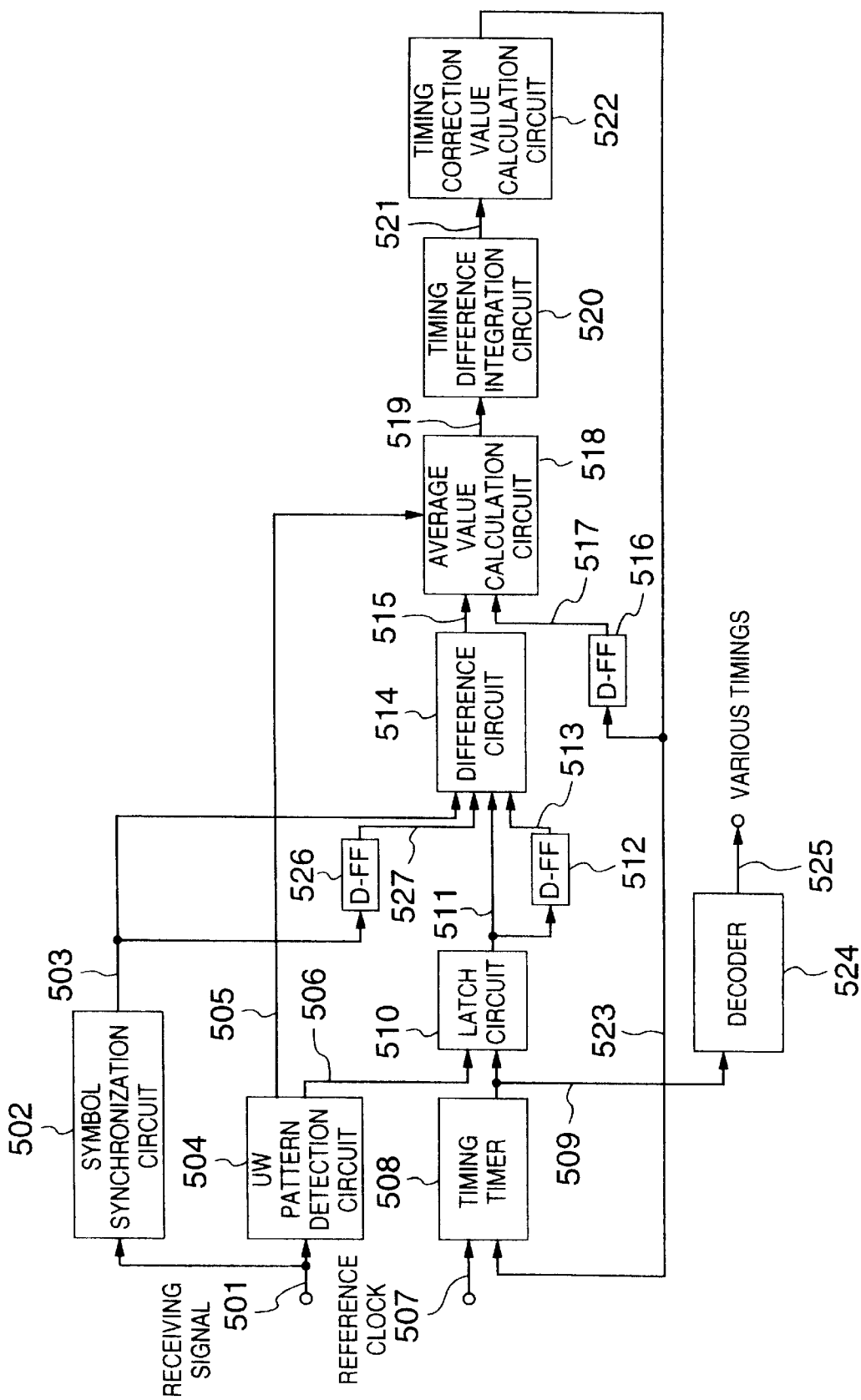
FIG. 11 is a block diagram showing a synchronizer according to a fifth embodiment of the present invention.

A synchronizer according to a fifth embodiment of the present invention, as shown in FIG. 11, is different from the synchronizer according to the second embodiment described above in that a symbol synchronizing circuit 502 supplied with a receiving signal 501 is provided on the input side of a difference circuit 514, that a D flip-flop (D-FF) circuit 526 for holding an output signal 503 (a symbol synchronization signal for the immediately preceding period) of the symbol synchronizing circuit 502 is provided on the input side of the difference circuit 514, and that the differentiation circuit 514 detects the difference between the frame timing of the transmitter and that of the receiver using the output signal 503 of the symbol synchronizing circuit 502 and an output signal 527 of the D flip-flop circuit 526.

Unlike the synchronizer according to the first to fourth embodiments described above in which the UW pattern receiving time is detected with an accuracy of the symbol time, the synchronizer according to this embodiment is adapted to detect the UW pattern receiving time with an accuracy N times higher than the symbol time accuracy.

Figure 12A:
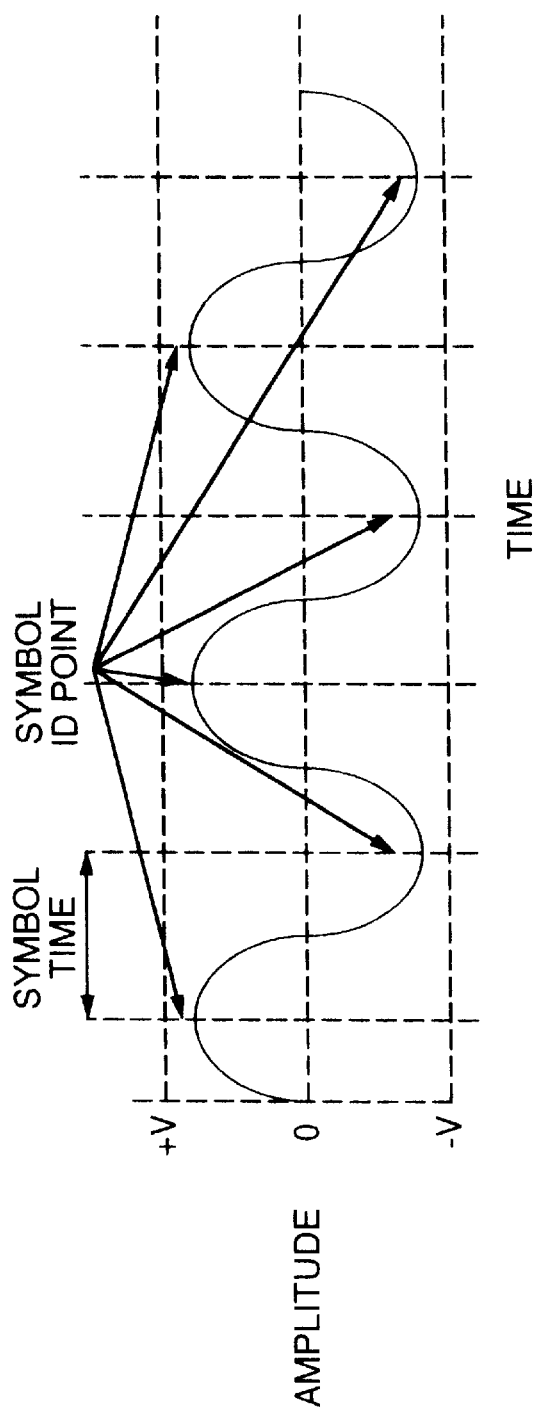
FIGS. 12A and 12B are diagrams for explaining the operation of the synchronizer shown in FIG. 11.

The operation of the circuits of the synchronizer according to the present embodiment, except for the symbol synchronizing circuit 502, the D flip-flop circuit 526 and the difference circuit 514, is similar to that of the synchronizer according to the second embodiment described above. Explanation will therefore be made only about the operation of the symbol synchronizing circuit 502, the D flip-flop circuit 526 and the difference circuit 514 below with reference to FIGS. 12A, 12B. For facilitating the understanding, the receiving signal 501 is assumed to include a symbol string changing in polarity at every symbol period in order to easily achieve the symbol synchronism.

The symbol synchronization circuit 502 determines the absolute value of the receiving signal 501 at intervals N times longer than the symbol period, and the determined absolute value is added for each symbol period. Specifically, let x be the receiving signal 501, n be the symbol number, T be the symbol time, and N be the number of detected symbol ID points during a symbol period (symbol ID point detection accuracy). Then, the sum y(k) as the result of the above-mentioned addition for the kth frame is given as follows.

$$y(k)=y(k)+|x((n+k/N)T)| \qquad (3\text{-}1)$$

Figure 12B:
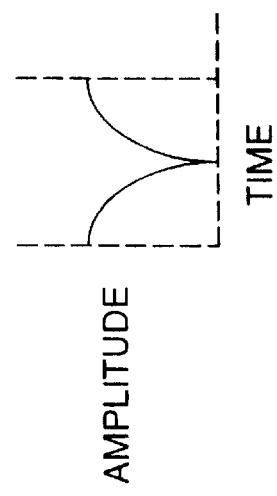

An example of the sum y(k) is shown in FIG. 12B. The symbol synchronizing circuit 502 decides that a point m(k) assuming the maximum sum y(k) represents the symbol ID point for the kth frame. The symbol ID point m(k) thus decided is stored in the D flip-flop circuit 526. The difference circuit 514 determines the difference between the frame timing of the transmitter and that of the receiver according to the following equation:

$$\{t(k+1)+m(k+1)/N\}-\{t(k)+m(k)/N\} \qquad (3\text{-}2)$$

where t(k+1) and t(k) are the UW pattern detection time for the (k+1)th frame and the kth frame, respectively, which are applied to the difference circuit 514 from a latch circuit 510 and a D flip-flop circuit 512. Consequently, the difference circuit 514 can determine the difference between the frame timing of the transmitter and that of the receiver using the UW pattern detection time N times as accurate as the symbol time.

Instead of integrating the absolute value of the receiving signal 501 according to equation (3-1), the envelope of the receiving signal 501 can be added as an alternative.

(Sixth Embodiment)

In the synchronizer according to the first to fifth embodiments described above, the UW pattern is detected at the same timing in each given frame. Therefore, the time difference between the current UW pattern detection time and the next UW pattern detection time always remains the same. A synchronizer according to a sixth embodiment of the present invention, on the other hand, is adapted to detect the difference between the frame timing of the transmitter and that of the receiver by receiving an arbitrary slot within a given frame.

Figure 14:
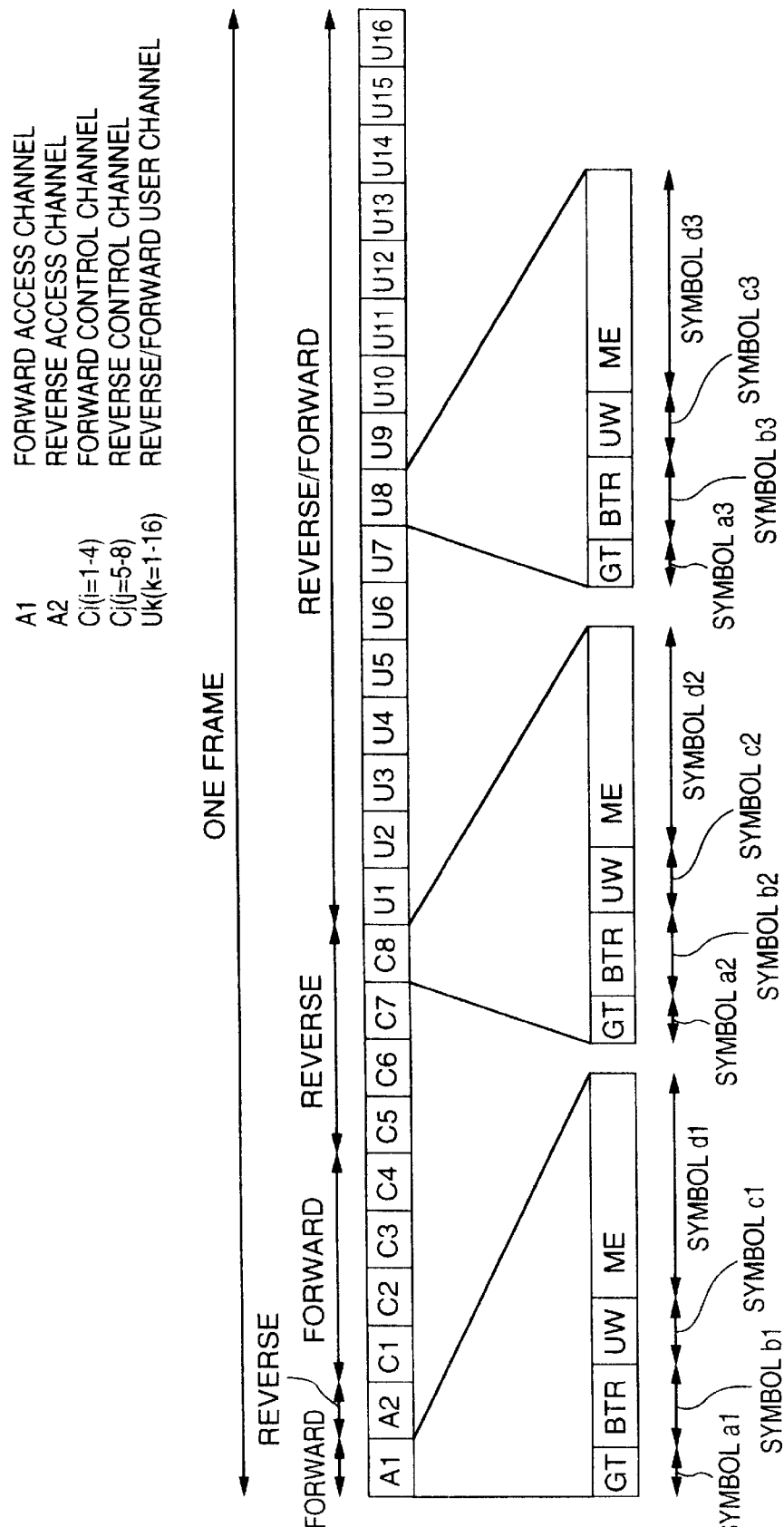
FIG. 14 is a diagram for explaining the operation of the synchronizer shown in FIG. 13.

In the frame format of the synchronizer according to this embodiment, each frame is configured of access channels A1, A2, control channels C1 to C8 and user channels U1 to U16, for example, as shown in FIG. 14. The access channels A1, A2 are used for notification from a base station and the position registration from a mobile unit. The control channels C1 to C8 are used for allotment of the user channels U1 to U16, etc. The user channels U1 to U16 are used for transmitting and receiving data.

In the mobile unit, a synchronism holding circuit receives the UW pattern transmitted from the base station using the forward-link access channel A1 thereby to achieve the frame synchronism. Also, a timing generating circuit generates a timing by frame using the information on the frame structure held therein. On the basis of this timing by frame, the control channel as designated using the forward-link access channel A1 by the base station is transmitted or received, or the data are transmitted or received using the user channel allotted from the base station by the particular control channel.

The operation of the synchronism holding circuit of the mobile unit will be explained with reference to the case of using the forward-link control channel C1 and the forward-link user channels U1, U2. For facilitating the understanding, the following symbols will be used:

tc1(k): Time when the UW pattern contained in the forward-link control channel C1 of the kth frame is detected tu1(k): Time when the UW pattern contained in the forward-link user channel U1 of the kth frame is detected tu2(k): Time when the UW pattern contained in the forward-link user channel U2 of the kth frame is detected tc1(k+1): Time when the UW pattern contained in the forward-link control channel C1 of the (k+1)th frame is detected tu1(k+1): Time when the UW pattern contained in the forward-link user channel U1 of the (k+1)th frame is detected tu2(k+1): Time when the UW pattern contained in the forward-link user channel U2 of the (k+1)th frame is detected Tu1c1: Standard time difference (count) between forward-link user channel U1 and forward-link control channel C1

Tu2U1: Standard time difference (count) between forward-link user channel U2 and forward-link user channel U1

Tu2c1: Standard time difference (count) between forward-link user channel U2 and forward-link control channel C1

The standard time differences (counts) Tu1c1, Tu2u1, Tu2c1 are stored in a memory 626.

For the kth frame, the count difference on the frame counter between the time when the UW pattern contained in the forward-link control channel C1 is detected and the time when the UW pattern contained in the forward-link user channel U1 is detected is expressed as $$tu1(k)-tc1(k) \qquad (4\text{-}1)$$

For the kth frame, the count difference on the frame counter between the time when the UW pattern contained in the forward-link user channel U1 is detected and the time when the UW pattern contained in the forward-link user channel U2 is detected is expressed as follows.

$$tu2(k)-tu1(k) \qquad (4\text{-}2)$$

For the kth frame, the count difference on the frame counter between the time when the UW pattern contained in the forward-link control channel C1 is detected and the time when the UW pattern contained in the forward-link user channel U2 is detected is expressed as $$tc1(k)-tu2(k) \qquad (4\text{-}3)$$

For the (k+1)th frame, the count difference on the frame counter between the time when the UW pattern contained in the forward-link control channel C1 is detected and the time when the UW pattern contained in the forward-link user channel U1 is detected is expressed as follows.

$$tu1(k+1)-tc1(k+1) \quad (4\text{-}4)$$

For the (k+1)th frame, the count difference on the frame counter between the time when the UW pattern contained in the forward-link user channel U1 is detected and the time when the UW pattern contained in the forward-link user channel U2 is detected is expressed as $$tu2(k+1)-tu1(k+1) \quad (4\text{-}5)$$

For the (k+1)th frame, the count difference on the frame counter between the time when the UW pattern contained in the forward-link control channel C1 is detected and the time when the UW pattern contained in the forward-link user channel U2 is detected is expressed as follows.

$$tc1(k+1)-tu2(k+1) \quad (4\text{-}6)$$

The timing deviation between the transmitter and the receiver between corresponding channels in a given frame can be calculated, therefore, by subtracting the corresponding standard time difference (count) from the results obtained by equations (4-1) to (4-6). It is possible, for example, to calculate the timing deviation between the transmitter and the receiver up to the forward-link user channel U1 from the forward-link control channel C1 by subtracting the standard time difference (count) Tu1c1 from the result tu1(k)−tc1(k) obtained according to equation (4-1) above.

Figure 13:
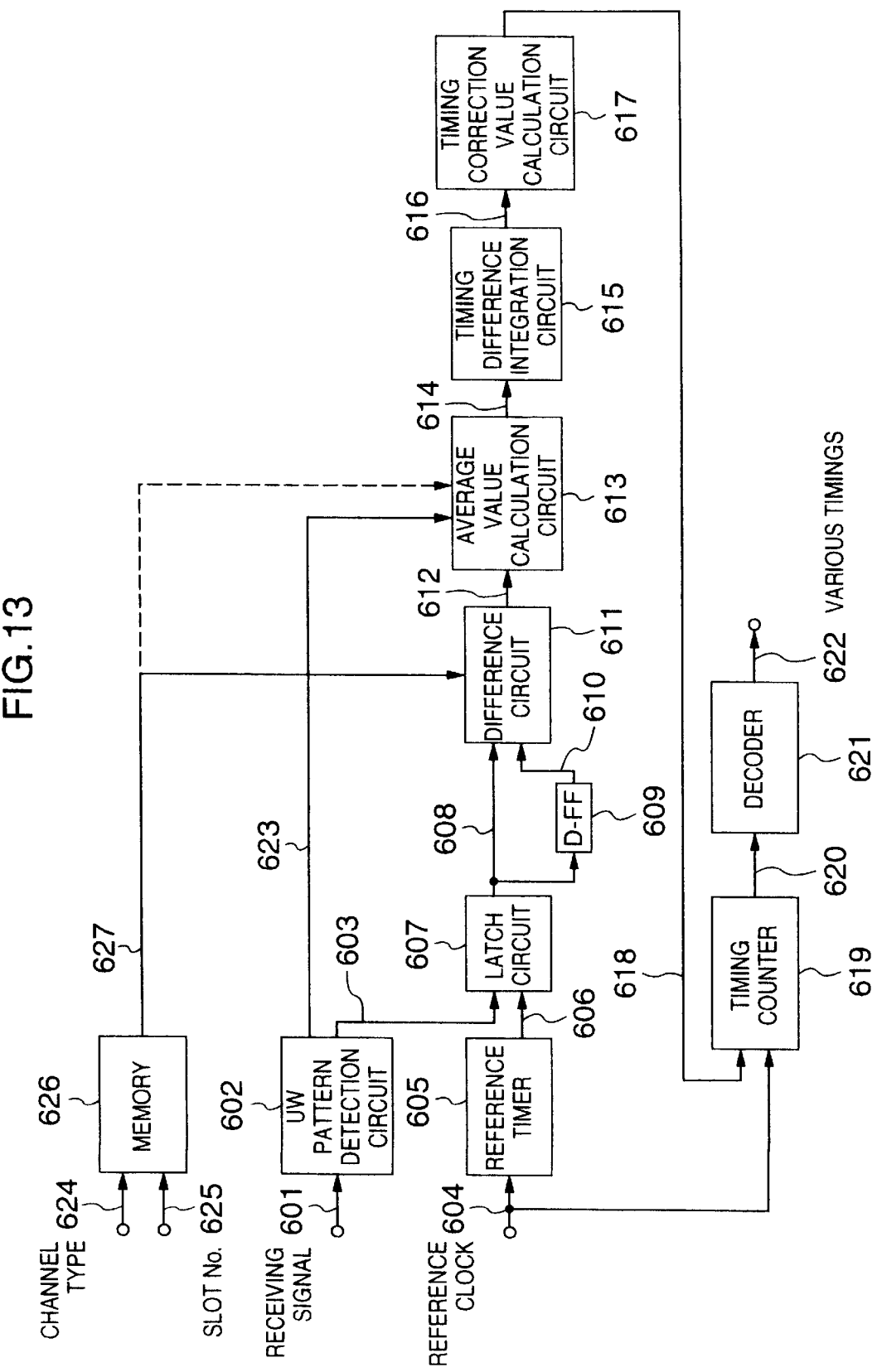
FIG. 13 is a block diagram showing a synchronizer according to sixth and seventh embodiments of the present invention.

The synchronizer according to this embodiment, as shown in FIG. 13, comprises the memory 626 for storing the standard time difference (count) corresponding to a channel type 624 and a slot number 625, so that the standard time difference (count) is read out of the memory 626 according to the channel type 624 and the slot number 625. The difference circuit 611 calculates the timing deviation between the transmitter and the receiver using an output signal 608 (say, time tu1(k)) of a latch circuit 607, an output signal 610 (say, time tc1(k)) of a D flip-flop circuit 609 and the standard time difference (say, the standard time Tu1c1) read out of the memory 626.

A synchronizer according to the present embodiment using the standard time difference (count) based on the channel type and the slot number is applicable also to the synchronizer according to the second to the fifth embodiments described above.

(Seventh Embodiment)

A synchronizer according to a seventh embodiment of the present invention is different from the synchronizer according to the sixth embodiment described above in that an output signal 627 of the memory 626 is applied also to an average value calculation circuit 613, as shown by a dashed line in FIG. 13.

Although the synchronizer according to the sixth embodiment concerns a method of detecting the difference in the receiving time of a known pattern (UW pattern) by channel type and slot number, the synchronizer according to the seventh embodiment is adapted to calculate the average value of the timing difference between the transmitter and the receiver without regard to the channel type or slot number.

The operation of the synchronizer according to this embodiment will be explained below with reference to the case of using the forward-link control channel C1 and the forward-link user channels U1, U2 using the symbols described above.

Each timing difference per symbol time is expressed as follows.

| | |
|---|---|
| $(tu1(k) - tc1(k) - Tu1c1)/Tu1c1$ | (5-1) |
| $(tu2(k) - tu1(k) - Tu2u1)/Tu2u1$ | (5-2) |
| $(tc1(k) - tu2(k) - Tu2c1)/Tu2c1$ | (5-3) |
| $(tu1(k + 1) - tc1(k + 1) - Tu1c1)/Tu1c1$ | (5-4) |
| $(tu2(k + 1) - tu1(k + 1) - Tu2u1)/Tu2u1$ | (5-5) |
| $(tc1(k + 1) - tu2(k + 1) - Tu2c1)/Tu2c1$ | (5-6) |

Also, the timing difference between the transmitter and the receiver per frame can be calculated by multiplying the results obtained from equations (5-1) and (5-5) by the number of symbols per frame (TFL).

Now, the operation of the synchronizer according to this embodiment will be explained with reference to the case given by equation (5-1). When the UW pattern contained in the forward-link control channel C1 is detected by a UW pattern detection circuit 602, an output signal 606 of a reference timer 605 is fetched into the latch circuit 607, after which the output signal 608 of the latch circuit 607 is held in the D flip-flop circuit 609. As a result, the UW pattern detection time tc1 is held in the D flip-flop circuit 609. After that, upon detection by the UW pattern detection circuit 602 of the UW pattern contained in the forward-link user channel U1, the output signal 606 of the reference timer 605 is fetched into the latch circuit 607. The UW pattern detection time tu1 thus is fetched into the latch circuit 607.

The memory 626 is supplied with the the channel type 624 and the slot number 625 for the UW pattern contained in the forward-link control channel C1, together with the channel type 624 and the slot number 625 for the UW pattern contained in the forward-link user channel U1. Consequently, the standard time difference Tu1c1 between the forward-link user channel U1 and the forward-link control channel C1 is read out of the memory 626 and applied to the difference circuit 611 and the average value calculation circuit 613.

The difference circuit 611 calculates the numerator of equation (5-1) using the UW pattern detection time tu1 fetched into the latch circuit 607, the UW pattern detection time tc1 held in the D flip-flop circuit 609 and the standard time difference Tu1c1 from the memory 626. The average value calculation circuit 613 calculates the equation (5-1) described above using an output signal 612 of the difference circuit 611 and the standard time difference Tu1c1 from the memory 626. As a consequence, the timing difference between the transmitter and the receiver per symbol is calculated. An output signal 614 of the average value calculation circuit 613 is integrated at a timing difference integration circuit 615. After that, a timing correction value calculation circuit 617 corrects the timing using an output signal 616 of the timing difference integration circuit 615.

In the foregoing embodiment, the average value calculation circuit 613 calculates the timing difference between the transmitter and the receiver per symbol using the output signal 612 of the difference circuit 611 and the standard time difference Tu1c1 from the memory 626. The timing difference between the transmitter and the receiver can alternatively be calculated, however, by multiplying the result obtained from equation (5-1) by the number (TFL) of symbols per frame. In such a case, the timing is corrected on the basis of the integrated value of the timing difference between the transmitter and the receiver per frame.

The synchronizer according to this embodiment is also applicable to the synchronizer according to the second to fifth embodiments described above.

(Eighth Embodiment)

In the case where a synchronizer uses an oblivion coefficient α shown in the equation below for calculating the average value of the difference between the reference clock for the transmitter and the reference clock for the receiver, it takes a considerable time before the average difference value converges if the difference between the reference clock for the transmitter and the reference clock for the receiver is large.

$$a(k)=\alpha \cdot a(k-1)+(1-\alpha)\cdot d(k) \qquad (6\text{-}1)$$

where a(k−1) is the average value of the difference between the reference clock for the transmitter and the reference clock for the receiver at time k, a(k) is the average value of the difference between the reference clock for the transmitter and the reference clock for the receiver at time k+1, and d(k) is the difference of the UW pattern detection time for the receiver detected at time k.

Figure 16:
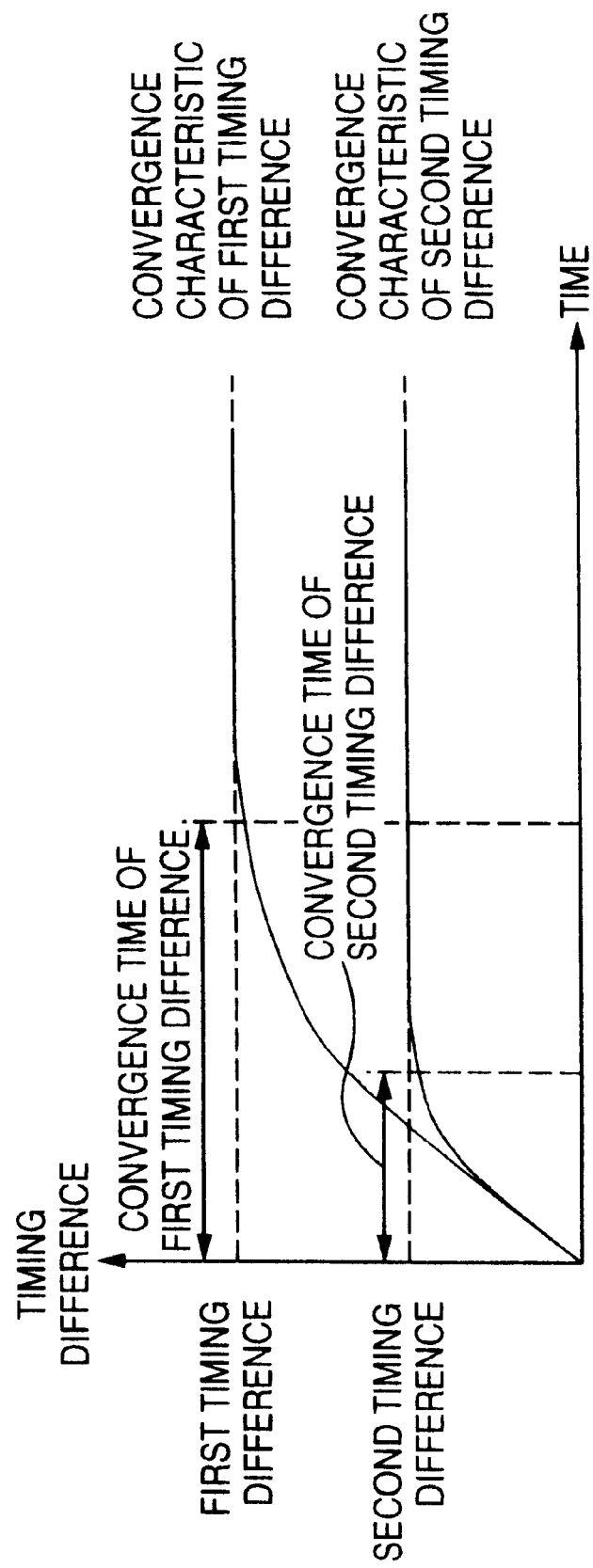
FIG. 16 is a diagram for explaining the operation of the synchronizer shown in FIG. 15.

This situation is shown in FIG. 16. Since the inclination of convergence is identical when the same oblivion coefficient α is used, a longer time is required before convergence when the time difference is large (first timing difference) than when the timing difference is small (second timing difference).

In view of this, a synchronizer according to an eighth embodiment of the present invention takes advantage of the fact that the difference between the reference clock for the transmitter and the reference clock for the receiver is substantially constant regardless of time. The detection time difference between known symbol patterns is stored in a memory for all the frames at the time of achieving the frame synchronism, and the initial value of the average difference between the reference clock for the transmitter and that for the receiver is calculated upon complete achievement of the frame synchronism thereby to improve the rate at which the timing difference is calculated.

Figure 15:
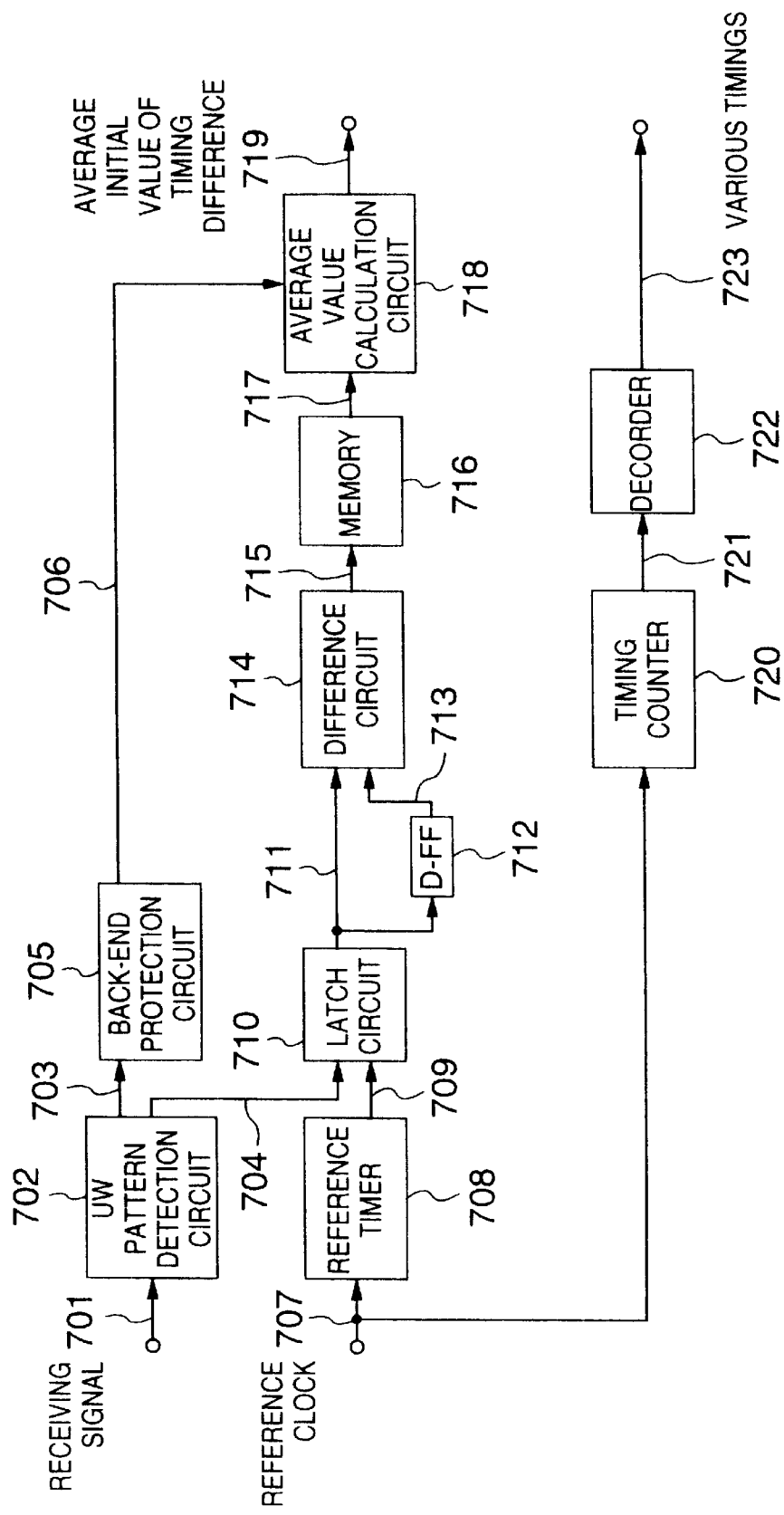
FIG. 15 is a block diagram showing a synchronizer according to an eighth embodiment of the present invention.

The synchronizer according to this embodiment, as shown in FIG. 15, comprises a UW pattern detection circuit 702, a back-end protection circuit 705, a reference timer 708, a latch circuit 710, a D flip-flop (D-FF) circuit 712, a difference circuit 714, a memory 716, an average value calculation circuit 718, a timing counter 720 and a decoder 722.

The UW pattern detection circuit 702 performs the pattern matching between a UW pattern (known symbol) and a received symbol string thereby to detect a UW pattern contained in a receiving signal 701. The back-end protection circuit 705 is provided for improving the detection accuracy of the UW pattern. In fact, the back-end protection circuit 705 decides that the frame synchronism is established when a UW pattern detection information signal 703 from the UW pattern detection circuit 702 indicates the detection of the UW patterns a predetermined number of times successively.

The reference timer 708 calculates the receiving time based on a reference clock 707. The latch circuit 710 latches an output signal 709 of the reference timer 708 by a UW pattern detection signal 704 from the UW pattern detection circuit 702 thereby to fetch the time (UW pattern detection time) when the UW pattern is detected. The D flip-flop circuit 712 holds the UW pattern detection time fetched into the latch circuit 710. The difference circuit 714 determines the difference between the frame timing of the transmitter and the frame timing of the receiver (frame timing difference) from the difference between an output signal 711 of the latch circuit 710 and an output signal 713 of the D flip-flop circuit 712. An output signal 715 of the difference circuit 714 is stored in the memory 716 thereby to store the timing difference maintained until establishment of a frame synchronization.

The average value calculation circuit 718 calculates the initial average value of the timing difference based on an output signal 717 (timing difference) of the memory 716 with a frame synchronization establishment signal 706 of the back-end protection circuit 705 as a trigger. After that, the timing is corrected in a manner similar to the case of the above-mentioned synchronizer according to the first embodiment using an output signal 719 (average initial value of the timing difference) of the average value calculation circuit 718. As a result, the timing difference between the transmitter and the receiver is not definitely determined, and therefore the process of timing correction can be prohibited until the frame synchronization is established.

The decoder 722 generates various timings 723 based on an output signal 721 of the timing counter 720.

(Ninth Embodiment)

A synchronizer according to a ninth embodiment of the present invention is intended to further improve the timing difference convergence characteristic as compared with the synchronizer according to the eighth embodiment described above.

Figure 17:
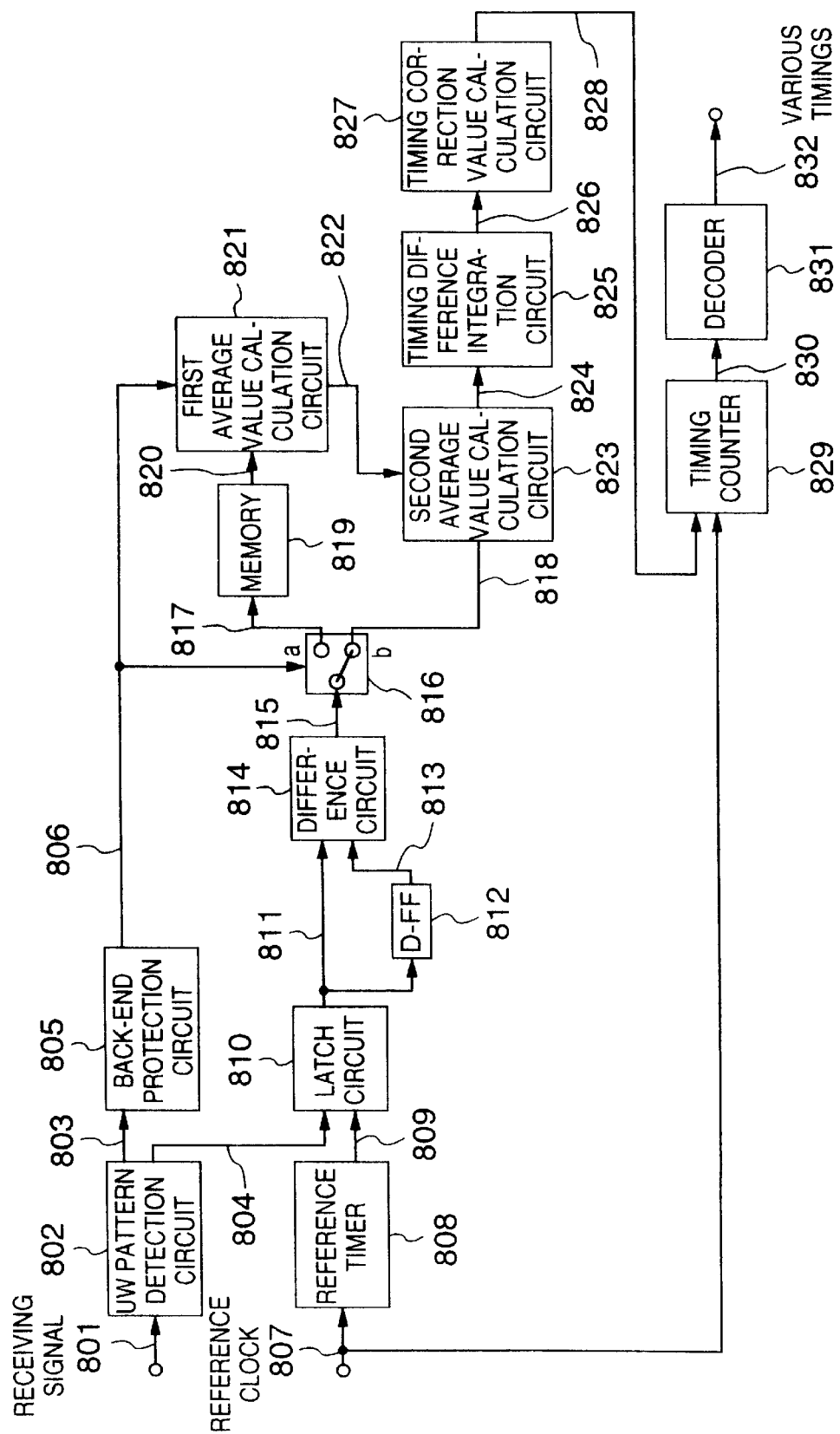
FIG. 17 is a block diagram showing a synchronizer according to a ninth embodiment of the present invention.

The synchronizer according to this embodiment, as shown in FIG. 17, comprises a UW pattern detection circuit 802, a back-end protection circuit 805, a reference timer 808, a latch circuit 810, a D flip-flop (D-FF) circuit 812, a difference circuit 814, a switch 816, a memory 819, a first average value calculation circuit 821, a second average value calculation circuit 823, a timing difference integration circuit 825, a timing correction value calculation circuit 827, a timing counter 829 and a decoder 831.

The UW pattern detection circuit 802 performs the pattern matching process between a UW pattern (a known symbol) and a receiving symbol string thereby to detect a UW pattern contained in a receiving signal 801. The back-end protection circuit 805 is provided for the purpose of improving the detection accuracy of the UW pattern. In fact, the back-end protection circuit 805 decides that a frame synchronism is established when a UW pattern detection information 803 from the UW pattern detection circuit 802 indicates the detection of the UW patterns a predetermined number of times in succession.

The reference timer 808 calculates the receiving time based on a reference clock 807. The latch circuit 810 latches an output signal 809 of the reference timer 808 by a UW pattern detection signal 804 from the UW pattern detection circuit 802 thereby to fetch the time when the UW pattern is detected (UW pattern detection time). The D flip-flop circuit 812 holds the UW pattern detection time fetched into the latch circuit 810. The difference circuit 814 determines the timing difference between the transmitter and the receiver from the difference between an output signal 811 of the latch circuit 810 and an output signal 813 of the D flip-flop circuit 812.

The switch 816 is controlled by a frame synchronism establishment signal 806 from the back-end protection circuit 805, and is closed to side a until the frame synchronism is established. As a result, an output signal 815 of the difference circuit 814 (timing difference) is stored in the memory 819 until the frame synchronism is established. The first average value calculation circuit 821 calculates the initial average value of the timing difference based on an output signal 820 (timing difference) of the memory 819 with the frame synchronism establishment signal 806 of the back-end protection circuit 805 as a trigger.

With the subsequent establishment of the frame synchronism, the switch 816 is controlled by the frame synchronism establishment signal 806 of the back-end protection circuit 805 and thus is turned to side b. The second average value calculation circuit 823 updates the average value of the timing difference based on equation (6-1) using the average initial value of the timing difference indicated by an output signal 822 of the first average value calculation circuit 821 and the output signal 815 of the difference circuit 814.

Then, the timing difference integration circuit 825 and the timing correction value calculation circuit 827 perform the timing correction process using an output signal 824 of the second average value calculation circuit 823, as in the synchronizer according to the first embodiment described above. The decoder 831 generate various timings 832 based on an output signal 830 of the timing counter 829.

Figure 18:
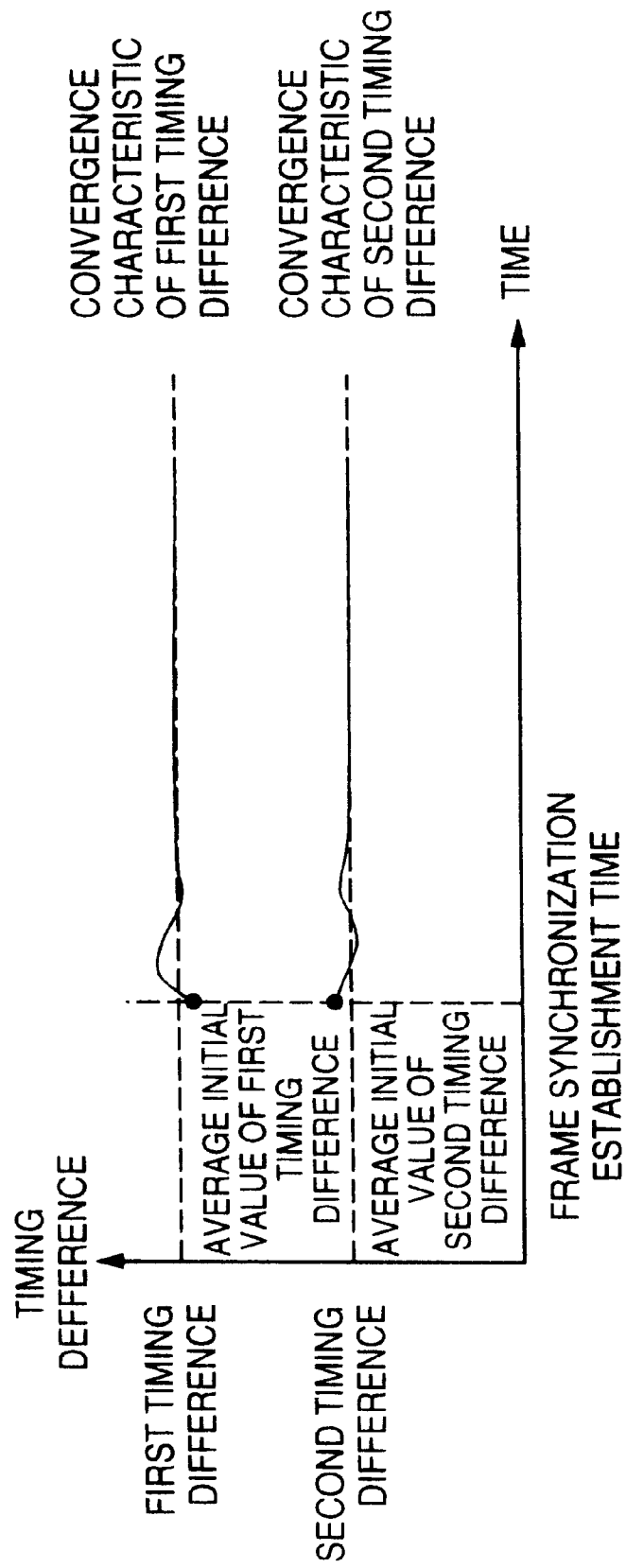
FIG. 18 is a diagram for explaining the operation of the synchronizer shown in FIG. 17.

As described above, in the synchronizer according to this embodiment in which the timing correction process is performed with the timing difference before frame synchronism establishment as an initial value, as shown in FIG. 18, the convergence characteristic of the timing difference is improved regardless of the magnitude of the timing difference.

(Tenth Embodiment)

The synchronizer according to the first embodiment described above sets the timing of the receiver to conform with that of the transmitter based on the integrated average value of the timing difference between the transmitter and the receiver. Also, in the synchronizer according to the eighth and ninth embodiments described above, the average initial value of the timing difference is calculated upon establishment of frame synchronism thereby to cause the timing of the receiver to follow that of the transmitter. In the timing correction using the average value of the timing difference between the transmitter and the receiver, however, the timing difference between the transmitter and the receiver is sometimes undesirably eliminated in spite of the fact that the operation becomes stable by lengthening the average time. In view of this, a synchronizer according to a tenth embodiment of the present invention calculates the timing correction value based on the timing difference between the transmitter and the receiver and calculates the timing correction value based on the histogram of the receiving time of a known transmission pattern.

Figure 19:
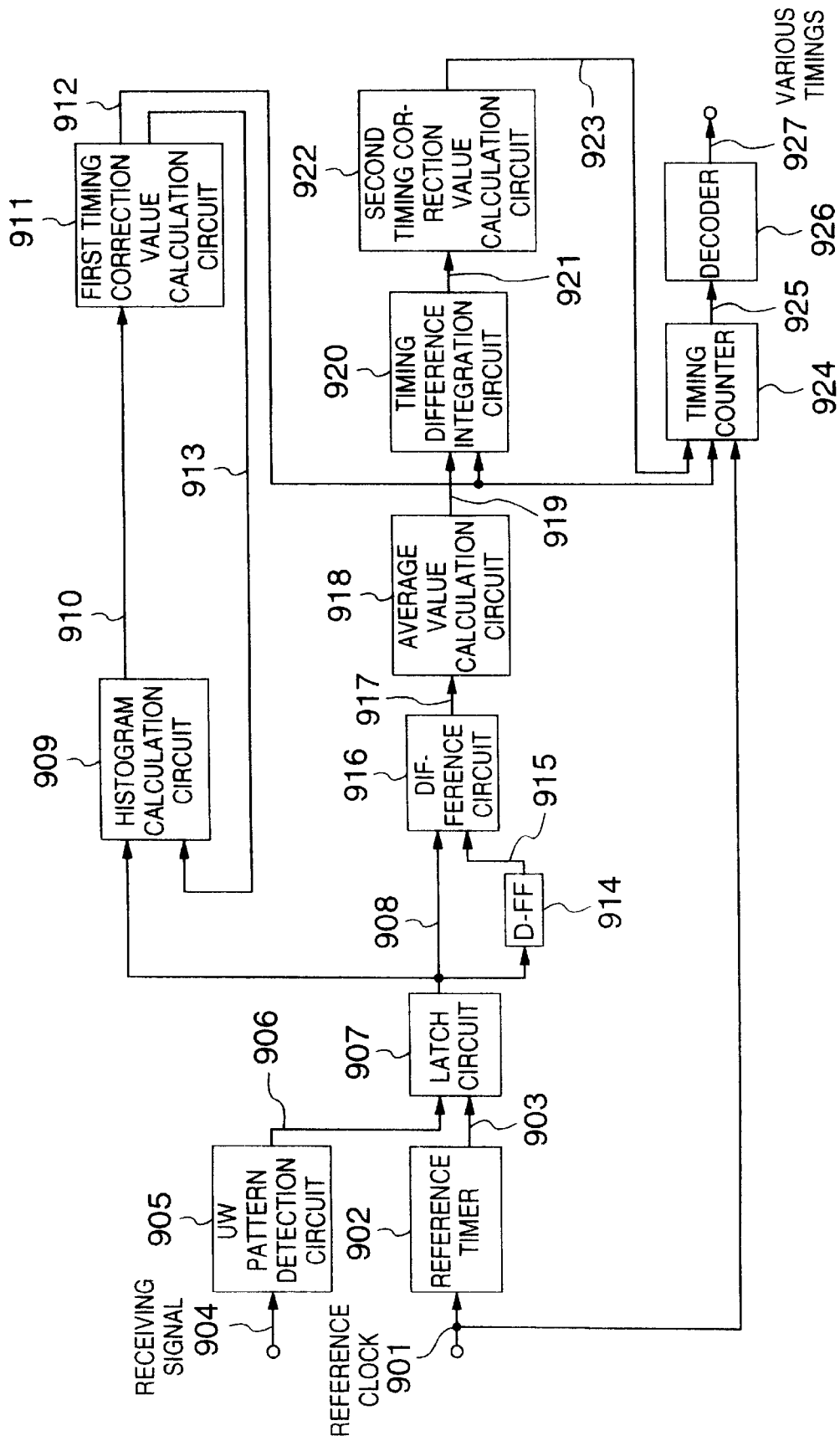
FIG. 19 is a block diagram showing a synchronizer according to a tenth embodiment of the present invention.

The synchronizer according to the present embodiment, as shown in FIG. 19, comprises a reference timer 902, a UW pattern detection circuit 905, a latch circuit 907, a histogram calculation circuit 909, a first timing correction value calculation circuit 911, a D flip-flop (D-FF) circuit 914, a difference circuit 916, an average value calculation circuit 918, a timing difference calculation circuit 920, a second timing correction value calculation circuit 922, a timing counter 924 and a decoder 926. In this synchronizer, the timing of the receiver is set to conform with that of the transmitter based on the histogram of the UW pattern detection time. Even in the case where the UW pattern is not detected, the timing of the receiver is set to conform with that of the transmitter based on the average value of the timing difference between the transmitter and the receiver.

Now, explanation will be made about a method of timing correction based on the histogram of the UW pattern detection time by the synchronizer according to this embodiment.

The UW pattern detection circuit 905 performs the pattern matching process between a UW pattern (a known symbol) and a receiving symbol string thereby to detect a UW pattern contained in a receiving signal 904. The reference timer 902 calculates the receiving time based on a reference clock 901. The latch circuit 907 latches an output signal 903 of the reference timer 902 by a UW pattern detection signal 906 from the UW pattern detection circuit 905 thereby to fetch the time when the UW pattern is detected (UW pattern detection time). The histogram calculation circuit 909 calculates the histogram of the UW pattern detection time using an output signal 908 of the latch circuit 907. The first timing correction value calculation circuit 911 calculates the timing correction value based on an output signal 910 of the histogram calculation circuit 909. The first timing correction value calculation circuit 911 performs the following process:

(1) The frame timing of the receiver, if deviated backward of the frame timing of the transmitter by a set value or more, is corrected in forward direction by the set value.

(2) The frame timing of the receiver, if deviated forward of the frame timing of the transmitter by a set value or more, on the other hand, is corrected backward by the set value.

(3) In the case where the deviation of the frame timing of the receiver with respect to that of the transmitter is not more than a set value, the frame timing of the receiver is not corrected.

In actual practice, assume that the set value is 1. In correcting the frame timing of the receiver in forward direction by the set value, the initial value of the timing counter 924 is set to +1, while in correcting the frame timing of the receiver backward by the set value, on the other hand, the initial value of the timing counter 924 is set to −1. In this way, the frame length is increased or decreased, as the case may be, by one frame.

For timing correction, the histogram calculation circuit 909 is reset. Also, in order to prevent an erroneous operation from occurring due to the simultaneous execution of the timing correction based on the histogram and the timing correction based on the integrated average value of the timing difference, the timing difference integration circuit 920 performs the following process:

(1) In the case where the frame timing of the receiver is corrected in forward direction by a set value (in the case where the frame length is shortened once), the correction value is subtracted from the integrated value.

(2) In the case where the frame timing of the receiver is corrected backward by a set value (in the case where the frame length is lengthened once), the correction value is added to the integrated value.

Now, explanation will be made about a method of timing correction based on the integrated average value of the timing difference between the transmitter and the receiver in the synchronizer according to the present embodiment.

The UW pattern detection circuit 905 performs the pattern matching process between a UW pattern (a known symbol) and a receiving symbol string thereby to detect a UW pattern contained in the receiving signal 904. The reference timer 902 calculates the receiving time based on the reference clock 901. The latch circuit 907 latches the output signal 903 of the reference timer 902 by the UW pattern detection signal 906 from the UW pattern detection circuit 905 thereby to fetch the time when the UW pattern is detected (UW pattern detection time). The D flip-flop circuit 914 holds the UW pattern detection time fetched into the latch circuit 907. The difference circuit 916 determines the timing difference between the transmitter and the receiver from the difference between the output signal 908 of the latch circuit 907 and an output signal 915 of the D flip-flop circuit 914. The average value calculation circuit 918 calculates the average value of the timing difference using an output signal 916 of the difference circuit 917. The timing difference integration circuit 920 calculates the integrated average value of the timing difference using an output signal 919 of the average value calculation circuit 918. The second timing correction value calculation circuit 922 calculates the timing correction value using an output signal 921 of the timing difference integration circuit 920. The second timing correction value calculation circuit 922 performs the following process:

(1) The frame timing of the receiver, if deviated backward of the frame timing of the transmitter by a set value or more, is corrected in forward direction by the set value.

(2) The frame timing of the receiver, if deviated forward of the frame timing of the transmitter by a set value or more, is corrected backward by the set value.

(3) In the case where the deviation of the frame timing of the receiver with respect to the frame timing of the transmitter is not more than the set value, the frame timing of the receiver is not corrected.

In actual practice, assume that the set value is 1. Then, in correcting the frame timing of the receiver in forward direction by the set value, the initial value of the timing counter 924 is set to +1, while in correcting the frame timing of the receiver backward by the set value, on the other hand, the initial value of the timing counter 924 is set to −1. In this way, the frame length is increased or decreased, as the case may be, by one frame.

The decoder 926 produces various timings 927 based on an output signal 925 of the timing counter 924.

(11th Embodiment)

In the synchronizer according to the tenth embodiment described above, the histogram of the UW pattern detection time is calculated and therefore the circuit size (mainly, the number of bits) of the histogram calculation circuit 909 is increased. In view of this, in a synchronizer according to an eleventh embodiment of the present invention, the histogram of the difference between the current UW pattern detection time and the previous UW pattern detection time is calculated in order to reduce the circuit size (mainly, the number of bits) of the histogram calculation circuit.

Figure 20:
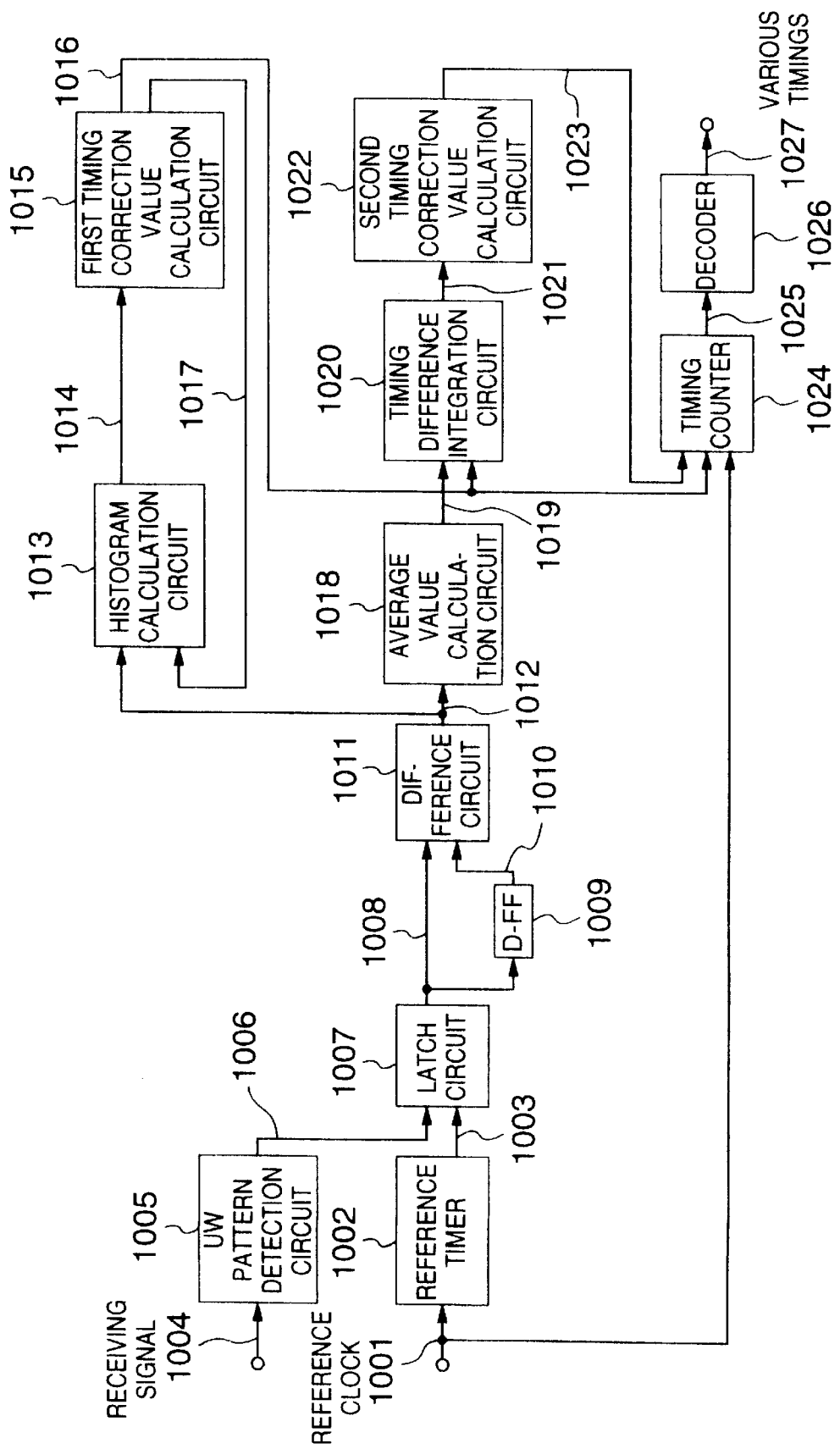
FIG. 20 is a block diagram showing a synchronizer according to an eleventh embodiment of the present invention.

The synchronizer according to this embodiment is different from the synchronizer according to the tenth embodiment described above in that a histogram calculation circuit 1013 is provided between a difference circuit 1011 and a first timing correction value calculation circuit 1015, as shown in FIG. 20.

Now, explanation will be made about a method of timing correction based on the histogram of the UW pattern detection time in the synchronizer according to this embodiment.

A UW pattern detection circuit 1005 performs the pattern matching process between a UW pattern (a known symbol) and a receiving symbol string thereby to detect a UW pattern contained in a receiving signal 1004. A reference timer 1002 calculates the receiving time based on a reference clock 1001. A latch circuit 1007 latches an output signal 1003 of the reference timer 1002 by a UW pattern detection signal 1006 from the UW pattern detection circuit 1005 thereby to fetch the time when the UW pattern is detected (UW pattern detection time). A D flip-flop circuit 1009 holds the UW pattern detection time fetched into the latch circuit 1007. The difference circuit 1011 determines the timing difference between the transmitter and the receiver from the difference between an output signal 1008 of the latch circuit 1007 and an output signal 1010 of the D flip-flop circuit 1009. The histogram calculation circuit 1013 calculates the histogram of the timing difference using an output signal 1012 of the differentiation circuit 1011. The first timing correction value calculation circuit 1015 calculates the timing correction value based on an output signal 1014 of the histogram calculation circuit 1013. The first timing correction value calculation circuit 1015 performs the following process:

(1) The frame timing of the receiver, if deviated backward of the frame timing of the transmitter by a set value or more, is corrected in forward direction by the set value.

(2) The frame timing of the receiver, if deviated forward of the frame timing of the transmitter by a set value or more, is corrected backward by the set value.

(3) In the case where the deviation of the frame timing of the receiver with respect to the frame timing of the transmitter is not more than the set value, the frame timing of the receiver is not corrected.

In actual practice, assume that the set value is 1. Then, in correcting the frame timing of the receiver in forward direction by the set value, the initial value of a timing counter 1024 is set to +1, while in correcting the frame timing of the receiver backward by the set value, on the other hand, the initial value of a timing counter 1024 is set to −1. In this way, the frame length is increased or decreased, as the case may be, by one frame.

In correcting the timing, the histogram calculation circuit 1013 is reset. Also, a timing difference integration circuit 1020 performs the following process in order to prevent an erroneous operation from occurring as a result of simultaneous execution of the timing correction based on the histogram and the timing correction based on the average integrated value of the timing difference.

(1) In the case where the frame timing of the receiver is corrected in forward direction by a set value, (in the case where the frame length is shortened by one frame), the correction value is subtracted from the integrated value.

(2) In the case where the frame timing of the receiver is corrected backward (in the case where the frame length is lengthened by one frame), the correction value is added to the integrated value.

Now, explanation will be made about a method of timing correction based on the integrated average value of the timing difference between the transmitter and the receiver of the synchronizer according to this embodiment.

The UW pattern detection circuit 1005 performs the pattern matching process between a UW pattern (a known symbol) and a receiving symbol string thereby to detect a UW pattern contained in the receiving signal 1004. The reference timer 1002 calculates the receiving time based on the reference clock 1001. The latch circuit 1007 latches the output signal 1003 of the reference timer 1002 by the UW pattern detection signal 1006 from the UW pattern detection circuit 1005 thereby to fetch the time when the UW pattern is detected (UW pattern detection time). The D flip-flop circuit 1009 holds the UW pattern detection time fetched into the latch circuit 1007. The difference circuit 1011 determines the timing difference between the transmitter and the receiver from the difference between the output signal 1008 of the latch circuit 1007 and the output signal 1010 of the D flip-flop circuit 1009. An average value calculation circuit 1018 calculates the average value of the timing difference using the output signal 1012 of the differentiation circuit 1011. The timing difference integration circuit 1020 calculates the integrated average value of the timing difference using an output signal 1019 of the average value calculation circuit 1018. A second timing correction value calculation circuit 1022 calculates a timing correction value using an output signal 1021 of the timing difference integration circuit 1020. The second timing correction value calculation circuit 1022 performs the following process:

(1) The frame timing of the receiver, if deviated backward of the frame timing of the transmitter by a set value or more, is corrected in forward direction by the set value.

(2) The frame timing of the receiver, if deviated forward of the frame timing of the transmitter by a set value or more, is corrected backward by the set value.

(3) In the case where the deviation of the frame timing of the receiver with respect to the frame timing of the transmitter is not more than the set value, the frame timing of the receiver is not corrected.

In actual practice, assume that the set value is 1. Then, in correcting the frame timing of the receiver in forward direction by the set value, the initial value of the timing counter 1024 is set to +1, while in correcting the frame timing of the receiver backward by the set value, on the other hand, the initial value of the timing counter 1024 is set to −1. In this way, the frame length is increased or decreased, as the case may be, by one frame.

A decoder 1026 generates various timings 1027 based on an output signal 1025 of the timing counter 1024.

(12th Embodiment)

A receiver is either in the continuous receiving mode or in the intermittent receiving mode. In the continuous receiving mode, a highly accurate clock is required. Such a clock, however, generally consumes considerable power. An attempt to reduce the power consumption using a low-accuracy clock in the intermittent receiving mode, on the other hand, requires to widen the receiving window, resulting in a lower intermittency. In a synchronizer according to a twelfth embodiment of the present invention, a high-accuracy clock is used for continuous receiving. At the same time, a low-accuracy clock is used to detect the timing difference between the transmitter and the receiver and calculate the clock correction value. In the intermittent receiving mode, on the other hand, the high-accuracy clock is terminated so that the timing is generated by controlling the receiving window with a low-accuracy clock.

Figure 21:
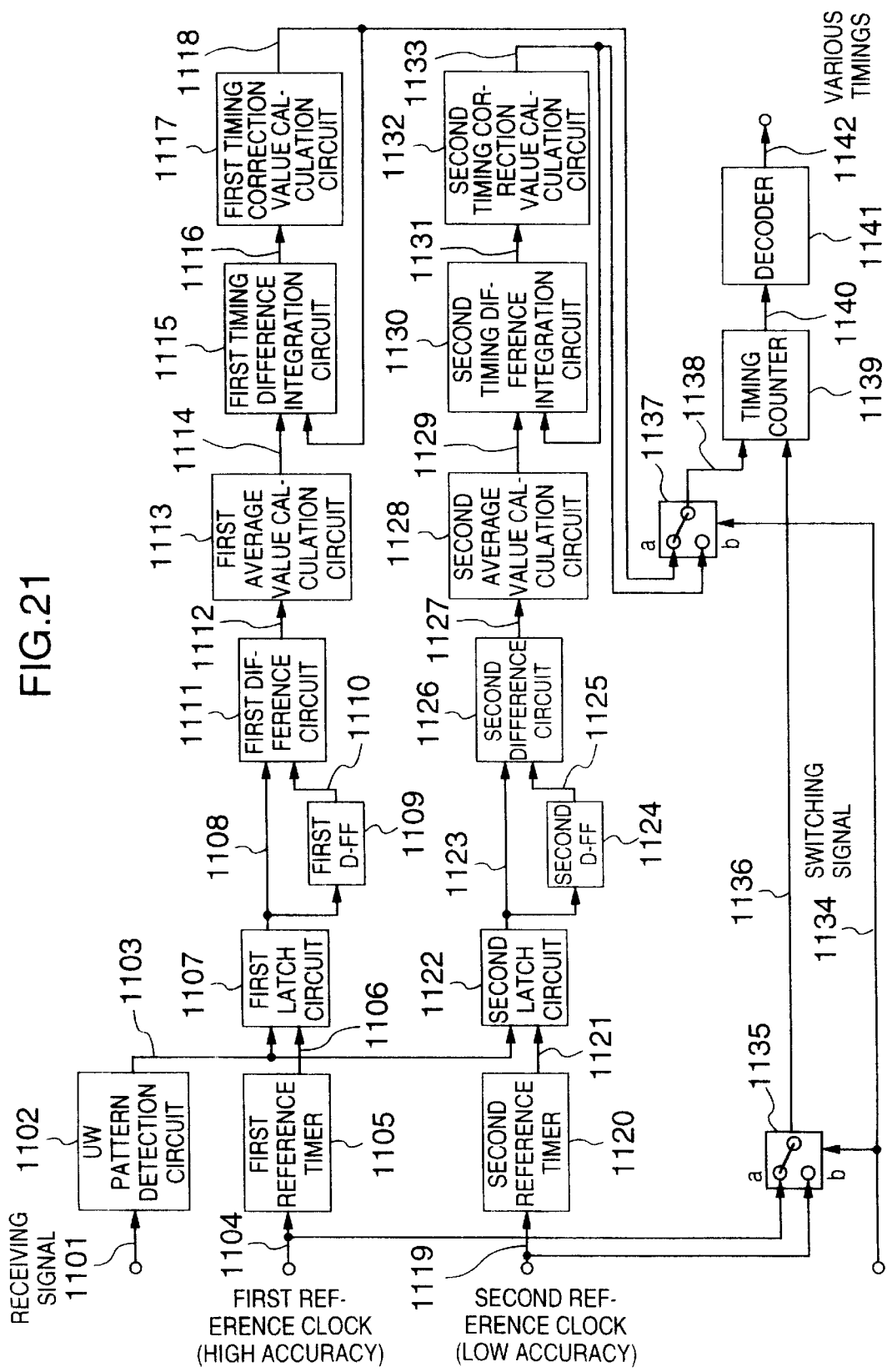
FIG. 21 is a block diagram showing a synchronizer according to a twelfth embodiment of the present invention.

The synchronizer according to this embodiment, as shown in FIG. 21, comprises a UW pattern detection circuit 1102, a first reference timer 1105, a first latch circuit 1107, a first D flip-flop (D-FF) circuit 1109, a first difference circuit 1111, a first average value calculation circuit 1113, a first timing difference calculation circuit 1115, a first timing correction value calculation circuit 1117, a second reference timer 1120, a second latch circuit 1122, a second D flip-flop (D-FF) circuit 1124, a second difference circuit 1126, a second average value calculation circuit 1128, a second timing difference calculation circuit 1130, a second timing correction value calculation circuit 1132, a first switch 1135, a second switch 1137, a timing counter 1139 and a decoder 1141.

Now, an explanation will be made about a method of timing correction in the synchronizer according to this embodiment.

For example, the UW pattern detection circuit 1102 performs the pattern matching process between a UW pattern (a known symbol) and a receiving symbol string thereby to detect a UW pattern contained in a receiving signal 1101. The first reference timer 1105 calculates the receiving time based on a high-accuracy first reference clock 1104. The second reference timer 1120 calculates the receiving time based on a low-accuracy second reference clock 1119. The first latch circuit 1107 latches an output signal 1106 of the first reference timer 1105 by a UW pattern detection signal 1103 from the UW pattern detection circuit 1102 thereby to fetch the time when the UW pattern is detected (first UW pattern detection time) by the high-accuracy clock. The second latch circuit 1122 latches an output signal 1121 of the second reference timer 1120 by the UW pattern detection signal 1103 from the UW pattern detection circuit 1102 thereby to fetch the time when the UW pattern is detected (second UW pattern detection time) by the low-accuracy clock. The first D flip-flop circuit 1109 holds the first UW pattern detection time fetched into the first latch circuit 1107. The second D flip-flop circuit 1124 holds the second UW pattern detection time fetched into the second latch circuit 1122. The first difference circuit 1111 determines the timing difference between a first transmitter and the receiver from the difference between an output signal 1108 of the first latch circuit 1107 and an output signal 1110 of the first D flip-flop circuit 1109. The second difference circuit 1126 determines the timing difference between a second transmitter and the receiver from the difference between an output signal 1123 of the second latch circuit 1122 and an output signal 1125 of the second D flip-flop circuit 1124.

The first average value calculation circuit 1113 calculates the average value of the first timing difference using an output signal 1112 of the first difference circuit 1111. The second average value calculation circuit 1128 calculates the average value of the second timing difference using an output signal 1127 of the second difference circuit 1126. The first timing difference integration circuit 1115 calculates the integrated average value of the first timing difference using an output signal 1114 of the first average value calculation circuit 1113. The second timing difference integration circuit 1130 calculates the integrated average value of the second timing difference using an output signal 1129 of the second average value calculation circuit 1128. The first timing correction value calculation circuit 1117 calculates the first timing correction value using an output signal 1116 of the first timing difference integration circuit 1115. The second timing correction value calculation circuit 1132 calculates the second timing correction value using an output signal 1131 of the second timing difference integration circuit 1130. The first and second timing correction value correction circuits 1117, 1132 perform the following process:

(1) The frame timing of the receiver, if deviated backward of the frame timing of the transmitter, is corrected in forward direction.

(2) The frame timing of the receiver, if deviated forward of the frame timing of the transmitter, is corrected backward.

In the case where the first timing correction value calculation circuit 1117 calculates the first timing correction value, the integrated value calculated by the first timing difference integration circuit 1115 is reduced by the first timing correction value. Also, in the case where the second timing correction value calculation circuit 1132 calculates the second timing correction value, the integrated value calculated by the second timing difference integration circuit 1130 is reduced by the second timing correction value.

The first switch 1135 and the second switch 1137 are switched by a change-over signal 1134 to side a in the continuous receiving mode and to side b in the intermittent receiving mode. The decoder 1141 generates various timings 1142 using an output signal 1140 of the timing counter 1139.

In the continuous receiving mode, the first switch 1135 and the second switch 1137 are switched to side a, so that the highly-accurate first reference clock 1104 and an output signal 1118 of the first timing correction value calculation circuit 1117 are applied to the timing counter 1139. As a result, the decoder 1141 generates the various timings 1142 by the highly-accurate first reference clock 1104. In the process, a first timing holding circuit operated by a high-accuracy clock and a second timing holding circuit operated by a low-accuracy clock are both in operation. The first timing holding circuit includes the first reference timer 1105, the first latch circuit 1107, the first D flip-flop circuit 1109, the first differentiation circuit 1111, the first average value calculation circuit 1113, the first timing difference calculation circuit 1115 and the first timing correction value calculation circuit 1117. The second timing holding circuit includes the second reference timer 1120, the second latch circuit 1122, the second D flip-flop circuit 1124, the second differentiation circuit 1126, the second average value calculation circuit 1128, the second timing difference calculation circuit 1130 and the second timing correction value calculation circuit 1132.

In the intermittent receiving mode, the first switch 1135 and the second switch 1137 are turned to side b, so that the low-accuracy second reference clock 1119 and an output signal 1133 of the second timing correction value calculation circuit 1132 are applied to the timing counter 1139. As a result, the decoder 1141 generates the various timings 1142 by the low-accuracy second reference clock 1119. In the process, the first timing holding circuit operated by the high-accuracy clock, including the first reference timer 1105, the first latch circuit 1107, the first D flip-flop circuit 1109, the first differentiation circuit 1111, the first average value calculation circuit 1113, the first timing difference calculation circuit 1115 and the first timing correction value calculation circuit 1117, is not in operation. On the other hand, the second timing holding circuit operated by the low-accuracy clock, including the second reference timer 1120, the second latch circuit 1122, the second D flip-flop circuit 1124, the second differentiation circuit 1126, the second average value calculation circuit 1128, the second timing difference calculation circuit 1130 and the second timing correction value calculation circuit 1132, holds substantially no timing difference since the timing difference between the transmitter and the receiver is detected by the low-accuracy second reference clock 1119 in the continuous receiving mode.

I claim:

1. A synchronizer comprising:
   a transmission pattern detection circuit for detecting a known transmission pattern transmitted from a transmitter and generating a transmission pattern detection information signal upon detection of said known transmission pattern;
   a difference detection circuit for detecting a difference between a reference timing of said transmitter and a reference timing of a receiver on the basis of a receiving time of said known transmission pattern;
   an average value calculation circuit for calculating an average value of said difference detected in said difference detection circuit and updating said calculated average value only upon receipt of said transmission pattern detection information signal from said transmission pattern detection circuit;
   an integration circuit for determining an integrated value by integrating said average value for each time of interrupting said receiver; and
   a correction value calculation circuit for calculating a correction value used to correct the reference timing of said receiver in a forward direction in the case where said integrated value exceeds a predetermined first threshold level, and to correct the reference timing of said receiver backward in the case where said integrated value is reduced below a predetermined second threshold level.

2. A synchronizer according to claim 1, further comprising a timing counter to be corrected in timing,
   wherein the difference between the reference timing of said transmitter and the reference timing of said receiver is calculated using said timing counter, and in the case where a frame length of the reference timing of said receiver is shortened by said correction value in order to deviate the timing in a forward direction by said timing correction in said timing counter, said correction value is added to the receiving time of said known transmission pattern, and in the case where the frame length of the reference timing of said receiver is lengthened by said correction value in order to deviate the timing backward by said timing correction in said timing counter, said correction value is subtracted from the receiving time of said known transmission pattern, thereby to calculate the receiving time of said known transmission pattern.

3. A synchronizer according to claim 1, further comprising a counter having a counting period shorter than a period of receiving said known transmission pattern,
   wherein an operation of said counter is started before receiving said known transmission pattern, and the operation of said counter is stopped after time when said known transmission pattern is assumed to be received, thereby to calculate the receiving time of said known transmission pattern.

4. A synchronizer according to claim 1, further comprising a counter having a counting period shorter than a period of receiving said known transmission pattern,
   wherein an operation of said counter is started before receiving said known transmission pattern, the operation of said counter is stopped upon receipt of said known transmission pattern, and in the case where said known transmission pattern is not received, the operation of said counter is stopped before time when said known transmission pattern is to be received, thereby to calculate the receiving time of said known transmission pattern.

5. A synchronizer according to claim 1, further comprising a symbol clock reproduction circuit for reproducing an optimum symbol clock using a clock representing an integer multiple of said symbol clock, and a timing circuit having a time accuracy equivalent to a symbol time accuracy,
   wherein said difference detection circuit detects the difference between the reference timing of said transmitter and the reference timing of said receiver with an accuracy an integer multiple of said symbol time accuracy.

6. A synchronizer according to claim 1, further comprising a selection circuit for selecting a reference time by a channel type and a slot number, and a memory for storing a reference time determined by said channel type and said slot number,
   wherein said difference detection circuit detects the difference between the reference timing of said transmitter and the reference timing of said receiver without regard to said channel type and said slot number.

7. A synchronizer according to claim 1, further comprising a selection circuit for selecting a reference time by a channel type and a slot number, and a memory for storing a reference time determined by said channel type and said slot number,
   wherein said detection circuit detects the difference between the reference timing of said difference transmitter and the reference timing of said receiver without regard to said channel type and said slot number, and said average value calculation circuit calculates the average value of said difference using the number of slots as counted from a previous receiving time of the known symbol string.

8. A synchronizer according to claim 1, further comprising:
- a memory for storing the differences between the reference clock of said transmitter and the reference clock of said receiver over all frames based on the detection time of the known symbol pattern at time of achieving a frame synchronism, and
- an initial value calculation circuit for calculating an initial average value of said differences upon complete achievement of said frame synchronism.

9. A synchronizer according to claim 8, further comprising an updating circuit for updating said difference by receiving the known symbol pattern of an arbitrary slot after complete achievement of said frame synchronism.

10. A synchronizer according to claim 1, further comprising:
- a histogram calculation circuit for calculating a histogram of the receiving time of said known symbol pattern and calculating the difference between the reference timing of said transmitter and the reference timing of said receiver, and
- a second correction value calculation circuit for calculating a timing correction value based on said calculated histogram.

11. A synchronizer according to claim 1, further comprising:
- a histogram calculation circuit for calculating a histogram of the difference of the receiving time of said known symbol pattern to calculate the difference between the reference timing of said transmitter and the reference timing of said receiver, and
- a second correction value calculation circuit for calculating a timing correction value based on said calculated histogram.

12. A synchronizer according to claim 1, further comprising:
- a high-accuracy reference clock oscillator;
- a low-accuracy reference clock oscillator;
- a timing correction circuit for correcting various timings using said high-accuracy reference clock and calculating an average value of the difference between the reference clock of said transmitter and the reference clock of said receiver using said low-accuracy reference clock in a continuous receiving mode; and
- a timing control circuit for controlling said various timings based on said average value calculated using said low-accuracy reference clock in an intermittent receiving mode.

13. A synchronizer provided in a receiver, comprising:
- a transmission pattern detection circuit for detecting a known transmission pattern transmitted from a transmitter and generating a transmission pattern detection information signal upon detection of said transmission pattern;
- a timing difference detection circuit for detecting a difference between a reference timing of said transmitter and a reference timing of said receiver on the basis of a receiving time of said transmission pattern;
- an average value calculation circuit for calculating an average value of said detected difference and updating said calculated average value only upon receipt of said transmission pattern detection information signal from said transmission pattern detection circuit;
- an integration circuit for determining an integrated value by integrating said average value for each time of interrupting said receiver; and
- a correction value calculation circuit for calculating a correction value to correct the reference timing of said receiver in forward direction in the case where said integrated value exceeds a predetermined first threshold level and to correct the reference timing of said receiver backward in the case where said integrated value is reduced below a predetermined second threshold level.

14. A synchronizer according to claim 13, further comprising a timing counter with an initial value set in accordance with said correction value;
- wherein said timing difference detection circuit detects the difference between the reference timing of said transmitter and the reference timing of said receiver on the basis of a count value of said timing counter, and
- said average value calculation circuit correcting said detected difference in accordance with said correction value and then calculating the average value of said corrected difference.

15. A synchronizer according to claim 13, further comprising:
- a reference timer having a counting period shorter than a period of receiving said transmission pattern and for detecting the receiving time of said transmission pattern; and
- a reference timer control circuit for starting an operation of said reference timer before receiving said transmission pattern and stopping the operation of said reference timer after time when said transmission pattern is assumed to be received.

16. A synchronizer according to claim 15, wherein said reference timer control circuit stops the operation of said reference timer upon detection of said transmission patter by said transmission pattern detection circuit.

17. A synchronizer according to claim 13, further comprising a symbol synchronization circuit for determining an absolute value of said transmission pattern at a period an integer multiple of a symbol period of said transmission pattern, adding said absolute value for each symbol period, and deciding on a symbol identification point from the added absolute value;
- wherein said timing difference detection circuit detects the difference between the reference timing of said transmitter and the reference timing of said receiver based on the receiving time of said transmission pattern and said symbol identification point.

18. A synchronizer according to claim 13, further comprising a memory for storing a reference time determined by a channel type and a slot number,
- wherein said timing difference detection circuit detects the difference between the reference timing of said transmitter and the reference timing of said receiver on the basis of the receiving time of said transmission pattern and said reference time read out of said memory.

19. A synchronizer according to claim 18, wherein said average value calculation circuit calculates the average value of said difference divided by said reference time.

20. A synchronizer according to claim 13, further comprising:
- a memory for storing the differences between the reference timing of said transmitter and the reference timing of said receiver based on the receiving time of said transmission pattern over all frames at time of achieving a frame synchronism;
- a back-end protection circuit for generating a frame synchronism establishment signal upon complete achievement of said frame synchronism; and an initial value calculation circuit for reading the differences stored in said memory to calculate an initial average value of said differences upon receipt of said frame synchronism establishment signal from said back-end protection circuit.

21. A synchronizer according to claim 20, further comprising a switch for preventing the difference between the reference timing of said transmitter and the reference timing of said receiver from being applied to said initial value calculation circuit upon receipt of said frame synchronism establishment signal from said back-end protection circuit.

22. A synchronizer according to claim 13, further comprising:
a histogram calculation circuit for calculating a histogram of the receiving time of said transmission pattern; and
a second correction value calculation circuit for calculating a second correction value for correcting the reference timing of said receiver on the basis of said calculated histogram.

23. A synchronizer according to claim 13, further comprising:
a histogram calculation circuit for calculating a histogram of the difference between the reference timing of said transmitter and the reference timing of said receiver detected by said timing difference detection circuit; and
a second correction value calculation circuit for calculating a second correction value to correct the reference timing of said receiver on the basis of said calculated histogram.

24. A synchronizer provided in a receiver, comprising:
a transmission pattern detection circuit for detecting a known transmission pattern transmitted from a transmitter and generating a transmission pattern detection information signal upon detection of said transmission pattern;
a first timing difference detection circuit for detecting a first difference between the reference timing of said transmitter and the reference timing of said receiver on the basis of the receiving time of said transmission pattern using a high-accuracy reference clock;
a first average value calculation circuit for calculating a first average value of said detected first difference;
a first integration circuit for determining a first integrated value by integrating said first average value for each time of interrupting said receiver;
a first correction value calculation circuit for calculating a first correction value to correct the reference timing of said receiver in forward direction in the case where said first integrated value exceeds a predetermined first threshold level and to correct the reference timing of said receiver backward in the case where said first integrated value is reduced below a predetermined second threshold level;
a second timing difference detection circuit for detecting a second difference between the reference timing of said transmitter and the reference timing of said receiver based on the receiving time of said transmission pattern using a low-accuracy reference clock;
a second average value calculation circuit for calculating a second average value of said detected second difference;
a second integration circuit for determining a second integrated value by integrating said second average value for each time of interrupting said receiver; and
a second correction value calculation circuit for calculating a second correction value to correct the reference timing of said receiver in forward direction in the case where said second integrated value exceeds a predetermined third threshold level and to correct the reference timing of said receiver backward in the case where said second integrated value is reduced below a predetermined fourth threshold level;
wherein the reference timing of said receiver is corrected based on said first correction value and said second correction value is calculated by said second correction value calculation circuit in a continuous receiving mode, and
the reference timing of said receiver is corrected based on said second correction value in an intermittent receiving mode.

25. A synchronizer according to claim 2, further comprising a counter having a counting period shorter than a period of receiving said known transmission pattern,
wherein an operation of said counter is started before receiving said known transmission pattern, and the operation of said counter is stopped after time when said known transmission pattern is assumed to be received, thereby to calculate the receiving time of said known transmission pattern.

26. A synchronizer according to claim 2, further comprising a counter having a counting period shorter than a period of receiving said known transmission pattern,
wherein an operation of said counter is started before receiving said known transmission pattern, the operation of said counter is stopped upon receipt of said known transmission pattern, and in the case where said known transmission pattern is not received, the operation of said counter is stopped before time when said known transmission pattern is to be received, thereby to calculate the receiving time of said known transmission pattern.

27. A synchronizer according to claim 2, further comprising a selection circuit for selecting a reference time by a channel type and a slot number, and a memory for storing a reference time determined by said channel type and said slot number,
wherein said difference detection circuit detects the difference between the reference timing of said transmitter and the reference timing of said receiver without regard to said channel type and said slot number.

28. A synchronizer according to claim 3, further comprising a selection circuit for selecting a reference time by a channel type and a slot number, and a memory for storing a reference time determined by said channel type and said slot number,
wherein said difference detection circuit detects the difference between the reference timing of said transmitter and the reference timing of said receiver without regard to said channel type and said slot number.

29. A synchronizer according to claim 4, further comprising a selection circuit for selecting a reference time by a channel type and a slot number, and a memory for storing a reference time determined by said channel type and said slot number,
wherein said difference detection circuit detects the difference between the reference timing of said transmitter and the reference timing of said receiver without regard to said channel type and said slot number.

30. A synchronizer according to claim 5, further comprising a selection circuit for selecting a reference time by a channel type and a slot number, and a memory for storing a reference time determined by said channel type and said slot number, wherein said difference detection circuit detects the difference between the reference timing of said transmitter and the reference timing of said receiver without regard to said channel type and said slot number.

31. A synchronizer according to claim 25, further comprising a selection circuit for selecting a reference time by a channel type and a slot number, and a memory for storing a reference time determined by said channel type and said slot number, wherein said difference detection circuit detects the difference between the reference timing of said transmitter and the reference timing of said receiver without regard to said channel type and said slot number.

32. A synchronizer according to claim 26, further comprising a selection circuit for selecting a reference time by a channel type and a slot number, and a memory for storing a reference time determined by said channel type and said slot number, wherein said difference detection circuit detects the difference between the reference timing of said transmitter and the reference timing of said receiver without regard to said channel type and said slot number.

33. A synchronizer according to claim 2, further comprising a selection circuit for selecting a reference time by a channel type and a slot number, and a memory for storing a reference time determined by said channel type and said slot number, wherein said difference detection circuit detects the difference between the reference timing of said transmitter and the reference timing of said receiver without regard to said channel type and said slot number, and said average value calculation circuit calculates the average value of said difference using the number of slots as counted from a previous receiving time of the known symbol string.

34. A synchronizer according to claim 3, further comprising a selection circuit for selecting a reference time by a channel type and a slot number, and a memory for storing a reference time determined by said channel type and said slot number, wherein said difference detection circuit detects the difference between the reference timing of said transmitter and the reference timing of said receiver without regard to said channel type and said slot number, and said average value calculation circuit calculates the average value of said difference using the number of slots as counted from a previous receiving time of the known symbol string.

35. A synchronizer according to claim 4, further comprising a selection circuit for selecting a reference time by a channel type and a slot number, and a memory for storing a reference time determined by said channel type and said slot number, wherein said difference detection circuit detects the difference between the reference timing of said transmitter and the reference timing of said receiver without regard to said channel type and said slot number, and said average value calculation circuit calculates the average value of said difference using the number of slots as counted from a previous receiving time of the known symbol string.

36. A synchronizer according to claim 5, further comprising a selection circuit for selecting a reference time by a channel type and a slot number, and a memory for storing a reference time determined by said channel type and said slot number, wherein said difference detection circuit detects the difference between the reference timing of said transmitter and the reference timing of said receiver without regard to said channel type and said slot number, and said average value calculation circuit calculates the average value of said difference using the number of slots as counted from a previous receiving time of the known symbol string.

37. A synchronizer according to claim 25, further comprising a selection circuit for selecting a reference time by a channel type and a slot number, and a memory for storing a reference time determined by said channel type and said slot number, wherein said difference detection circuit detects the difference between the reference timing of said transmitter and the reference timing of said receiver without regard to said channel type and said slot number, and said average value calculation circuit calculates the average value of said difference using the number of slots as counted from a previous receiving time of the known symbol string.

38. A synchronizer according to claim 26, further comprising a selection circuit for selecting a reference time by a channel type and a slot number, and a memory for storing a reference time determined by said channel type and said slot number, wherein said difference detection circuit detects the difference between the reference timing of said transmitter and the reference timing of said receiver without regard to said channel type and said slot number, and said average value calculation circuit calculates the average value of said difference using the number of slots as counted from a previous receiving time of the known symbol string.

39. A synchronizer according to claim 2, further comprising:

a memory for storing the differences between the reference clock of said transmitter and the reference clock of said receiver over all frames based on the detection time of the known symbol pattern at time of achieving a frame synchronism, and an initial value calculation circuit for calculating an initial average value of said differences upon complete achievement of said frame synchronism.

40. A synchronizer according to claim 3, further comprising:

a memory for storing the differences between the reference clock of said transmitter and the reference clock of said receiver over all frames based on the detection time of the known symbol pattern at time of achieving a frame synchronism, and an initial value calculation circuit for calculating an initial average value of said differences upon complete achievement of said frame synchronism.

41. A synchronizer according to claim 4, further comprising:

a memory for storing the differences between the reference clock of said transmitter and the reference clock of said receiver over all frames based on the detection time of the known symbol pattern at time of achieving a frame synchronism, and an initial value calculation circuit for calculating an initial average value of said differences upon complete achievement of said frame synchronism.

42. A synchronizer according to claim 5, further comprising:

a memory for storing the differences between the reference clock of said transmitter and the reference clock of said receiver over all frames based on the detection time of the known symbol pattern at time of achieving a frame synchronism, and an initial value calculation circuit for calculating an initial average value of said differences upon complete achievement of said frame synchronism.

43. A synchronizer according to claim 6, further comprising:

a memory for storing the differences between the reference clock of said transmitter and the reference clock of said receiver over all frames based on the detection time of the known symbol pattern at time of achieving a frame synchronism, and an initial value calculation circuit for calculating an initial average value of said differences upon complete achievement of said frame synchronism.

44. A synchronizer according to claim 7, further comprising:

a memory for storing the differences between the reference clock of said transmitter and the reference clock of said receiver over all frames based on the detection time of the known symbol pattern at time of achieving a frame synchronism, and an initial value calculation circuit for calculating an initial average value of said differences upon complete achievement of said frame synchronism.

45. A synchronizer according to claim 25, further comprising:

a memory for storing the differences between the reference clock of said transmitter and the reference clock of said receiver over all frames based on the detection time of the known symbol pattern at time of achieving a frame synchronism, and an initial value calculation circuit for calculating an initial average value of said differences upon complete achievement of said frame synchronism.

46. A synchronizer according to claim 26, further comprising:

a memory for storing the differences between the reference clock of said transmitter and the reference clock of said receiver over all frames based on the detection time of the known symbol pattern at time of achieving a frame synchronism, and an initial value calculation circuit for calculating an initial average value of said differences upon complete achievement of said frame synchronism.

47. A synchronizer according to claim 27, further comprising:

a memory for storing the differences between the reference clock of said transmitter and the reference clock of said receiver over all frames based on the detection time of the known symbol pattern at time of achieving a frame synchronism, and an initial value calculation circuit for calculating an initial average value of said differences upon complete achievement of said frame synchronism.

48. A synchronizer according to claim 28, further comprising:

a memory for storing the differences between the reference clock of said transmitter and the reference clock of said receiver over all frames based on the detection time of the known symbol pattern at time of achieving a frame synchronism, and an initial value calculation circuit for calculating an initial average value of said differences upon complete achievement of said frame synchronism.

49. A synchronizer according to claim 29, further comprising:

a memory for storing the differences between the reference clock of said transmitter and the reference clock of said receiver over all frames based on the detection time of the known symbol pattern at time of achieving a frame synchronism, and an initial value calculation circuit for calculating an initial average value of said differences upon complete achievement of said frame synchronism.

50. A synchronizer according to claim 30, further comprising:

a memory for storing the differences between the reference clock of said transmitter and the reference clock of said receiver over all frames based on the detection time of the known symbol pattern at time of achieving a frame synchronism, and an initial value calculation circuit for calculating an initial average value of said differences upon complete achievement of said frame synchronism.

51. A synchronizer according to claim 31, further comprising:

a memory for storing the differences between the reference clock of said transmitter and the reference clock of said receiver over all frames based on the detection time of the known symbol pattern at time of achieving a frame synchronism, and an initial value calculation circuit for calculating an initial average value of said differences upon complete achievement of said frame synchronism.

52. A synchronizer according to claim 32, further comprising:

a memory for storing the differences between the reference clock of said transmitter and the reference clock of said receiver over all frames based on the detection time of the known symbol pattern at time of achieving a frame synchronism, and an initial value calculation circuit for calculating an initial average value of said differences upon complete achievement of said frame synchronism.

53. A synchronizer according to claim 33, further comprising:

a memory for storing the differences between the reference clock of said transmitter and the reference clock of said receiver over all frames based on the detection time of the known symbol pattern at time of achieving a frame synchronism, and an initial value calculation circuit for calculating an initial average value of said differences upon complete achievement of said frame synchronism.

54. A synchronizer according to claim 34, further comprising:

a memory for storing the differences between the reference clock of said transmitter and the reference clock of said receiver over all frames based on the detection time of the known symbol pattern at time of achieving a frame synchronism, and an initial value calculation circuit for calculating an initial average value of said differences upon complete achievement of said frame synchronism.

55. A synchronizer according to claim 35, further comprising:

a memory for storing the differences between the reference clock of said transmitter and the reference clock of said receiver over all frames based on the detection time of the known symbol pattern at time of achieving a frame synchronism, and an initial value calculation circuit for calculating an initial average value of said differences upon complete achievement of said frame synchronism.

56. A synchronizer according to claim 36, further comprising:

a memory for storing the differences between the reference clock of said transmitter and the reference clock of said receiver over all frames based on the detection time of the known symbol pattern at time of achieving a frame synchronism, and an initial value calculation circuit for calculating an initial average value of said differences upon complete achievement of said frame synchronism.

57. A synchronizer according to claim 37, further comprising:

a memory for storing the differences between the reference clock of said transmitter and the reference clock of said receiver over all frames based on the detection time of the known symbol pattern at time of achieving a frame synchronism, and an initial value calculation circuit for calculating an initial average value of said differences upon complete achievement of said frame synchronism.

58. A synchronizer according to claim 38, further comprising:

a memory for storing the differences between the reference clock of said transmitter and the reference clock of said receiver over all frames based on the detection time of the known symbol pattern at time of achieving a frame synchronism, and an initial value calculation circuit for calculating an initial average value of said differences upon complete achievement of said frame synchronism.

59. A synchronizer according to claim 39, further comprising an updating circuit for updating said difference by receiving the known symbol pattern of an arbitrary slot after complete achievement of said frame synchronism.

60. A synchronizer according to claim 40, further comprising an updating circuit for updating said difference by receiving the known symbol pattern of an arbitrary slot after complete achievement of said frame synchronism.

61. A synchronizer according to claim 41, further comprising an updating circuit for updating said difference by receiving the known symbol pattern of an arbitrary slot after complete achievement of said frame synchronism.

62. A synchronizer according to claim 42, further comprising an updating circuit for updating said difference by receiving the known symbol pattern of an arbitrary slot after complete achievement of said frame synchronism.

63. A synchronizer according to claim 43, further comprising an updating circuit for updating said difference by receiving the known symbol pattern of an arbitrary slot after complete achievement of said frame synchronism.

64. A synchronizer according to claim 44, further comprising an updating circuit for updating said difference by receiving the known symbol pattern of an arbitrary slot after complete achievement of said frame synchronism.

65. A synchronizer according to claim 45, further comprising an updating circuit for updating said difference by receiving the known symbol pattern of an arbitrary slot after complete achievement of said frame synchronism.

66. A synchronizer according to claim 46, further comprising an updating circuit for updating said difference by receiving the known symbol pattern of an arbitrary slot after complete achievement of said frame synchronism.

67. A synchronizer according to claim 47, further comprising an updating circuit for updating said difference by receiving the known symbol pattern of an arbitrary slot after complete achievement of said frame synchronism.

68. A synchronizer according to claim 48, further comprising an updating circuit for updating said difference by receiving the known symbol pattern of an arbitrary slot after complete achievement of said frame synchronism.

69. A synchronizer according to claim 49, further comprising an updating circuit for updating said difference by receiving the known symbol pattern of an arbitrary slot after complete achievement of said frame synchronism.

70. A synchronizer according to claim 50, further comprising an updating circuit for updating said difference by receiving the known symbol pattern of an arbitrary slot after complete achievement of said frame synchronism.

71. A synchronizer according to claim 51, further comprising an updating circuit for updating said difference by receiving the known symbol pattern of an arbitrary slot after complete achievement of said frame synchronism.

72. A synchronizer according to claim 52, further comprising an updating circuit for updating said difference by receiving the known symbol pattern of an arbitrary slot after complete achievement of said frame synchronism.

73. A synchronizer according to claim 53, further comprising an updating circuit for updating said difference by receiving the known symbol pattern of an arbitrary slot after complete achievement of said frame synchronism.

74. A synchronizer according to claim 54, further comprising an updating circuit for updating said difference by receiving the known symbol pattern of an arbitrary slot after complete achievement of said frame synchronism.

75. A synchronizer according to claim 55, further comprising an updating circuit for updating said difference by receiving the known symbol pattern of an arbitrary slot after complete achievement of said frame synchronism.

76. A synchronizer according to claim 56, further comprising an updating circuit for updating said difference by receiving the known symbol pattern of an arbitrary slot after complete achievement of said frame synchronism.

77. A synchronizer according to claim 57, further comprising an updating circuit for updating said difference by receiving the known symbol pattern of an arbitrary slot after complete achievement of said frame synchronism.

78. A synchronizer according to claim 58, further comprising an updating circuit for updating said difference by receiving the known symbol pattern of an arbitrary slot after complete achievement of said frame synchronism.

* * * * *